(12) United States Patent
Fujino et al.

(10) Patent No.: US 8,194,394 B2
(45) Date of Patent: Jun. 5, 2012

(54) POLARIZED ELECTRODE AND ELECTRIC DOUBLE-LAYER CAPACITOR

(75) Inventors: Takeshi Fujino, Saitama (JP); Byoungju Lee, Saitama (JP); Minoru Noguchi, Saitama (JP); Takahiro Takeshita, Saitama (JP); Hiroto Kobayashi, Saitama (JP); Kazuma Inoue, Okayama (JP); Nozomu Sugo, Ibaraki (JP); Yoshifumi Egawa, Okayama (JP)

(73) Assignee: Honda Motor Co., Ltd., Tokyo (JP)

( * ) Notice: Subject to any disclaimer, the term of this patent is extended or adjusted under 35 U.S.C. 154(b) by 595 days.

(21) Appl. No.: 12/067,907

(22) PCT Filed: Sep. 21, 2006

(86) PCT No.: PCT/JP2006/318736
§ 371 (c)(1),
(2), (4) Date: Aug. 19, 2009

(87) PCT Pub. No.: WO2007/034873
PCT Pub. Date: Mar. 29, 2007

(65) Prior Publication Data
US 2010/0002361 A1 Jan. 7, 2010

(30) Foreign Application Priority Data
Sep. 22, 2005 (JP) ................................ 2005-275424

(51) Int. Cl.
*H01G 9/00* (2006.01)
(52) U.S. Cl. ........ 361/502; 361/503; 361/504; 361/512; 361/516; 361/519
(58) Field of Classification Search .................. 361/502, 361/503–504, 508, 512, 516–519, 303, 523–528
See application file for complete search history.

(56) References Cited

U.S. PATENT DOCUMENTS

| | | | | |
|---|---|---|---|---|
| 5,426,561 A * | 6/1995 | Yen et al. | ....................... | 361/502 |
| 6,379,402 B1 * | 4/2002 | Suhara et al. | ................. | 29/25.03 |
| 6,827,879 B2 * | 12/2004 | Shinozaki et al. | ............. | 252/502 |
| 7,199,997 B1 * | 4/2007 | Lipka et al. | .................... | 361/502 |
| 7,286,334 B2 * | 10/2007 | Nakamura et al. | ............. | 361/502 |
| 7,567,429 B2 * | 7/2009 | Mori et al. | .................... | 361/502 |
| 2002/0027305 A1 | 3/2002 | Kibi et al. | | |
| 2005/0047061 A1 * | 3/2005 | Sugo et al. | ..................... | 361/502 |

FOREIGN PATENT DOCUMENTS

| | | |
|---|---|---|
| EP | 0 763 836 A2 | 3/1997 |
| EP | 1 168 389 A1 | 1/2002 |
| EP | 1 168 389 A1 | 1/2002 |
| JP | 2-264018 A | 10/1990 |
| JP | 8-119615 A | 5/1996 |
| JP | 9-156915 A | 6/1997 |
| JP | 10-50566 A | 2/1998 |
| JP | 2000-353642 A | 12/2000 |

(Continued)

*Primary Examiner* — Nguyen T Ha
(74) *Attorney, Agent, or Firm* — Arent Fox LLP

(57) ABSTRACT

The present invention provides a polarized electrode 12 containing mixed activated carbon composed of at least two activated carbons with different specific surface areas, and the specific surface area of the mixed activated carbon is not less than 900 $m^2/g$ and less than 1900 $m^2/g$. By setting the specific surface area of the mixed activated carbon to less than 1900 $m^2/g$, the resistance reduction ratio of the polarized electrode 12 rapidly increases.

13 Claims, 10 Drawing Sheets

FOREIGN PATENT DOCUMENTS

| | | |
|---|---|---|
| JP | 2002-83748 A | 3/2002 |
| JP | 2002-231588 A | 8/2002 |
| JP | 2004-047613 A | 2/2004 |
| JP | 2004-67498 A | 3/2004 |
| JP | 2005-294607 A | 10/2005 |
| JP | 2006-151699 A | 6/2006 |

* cited by examiner

FIG. 1 Cylindrical electric double-layer capacitor

FIG. 2
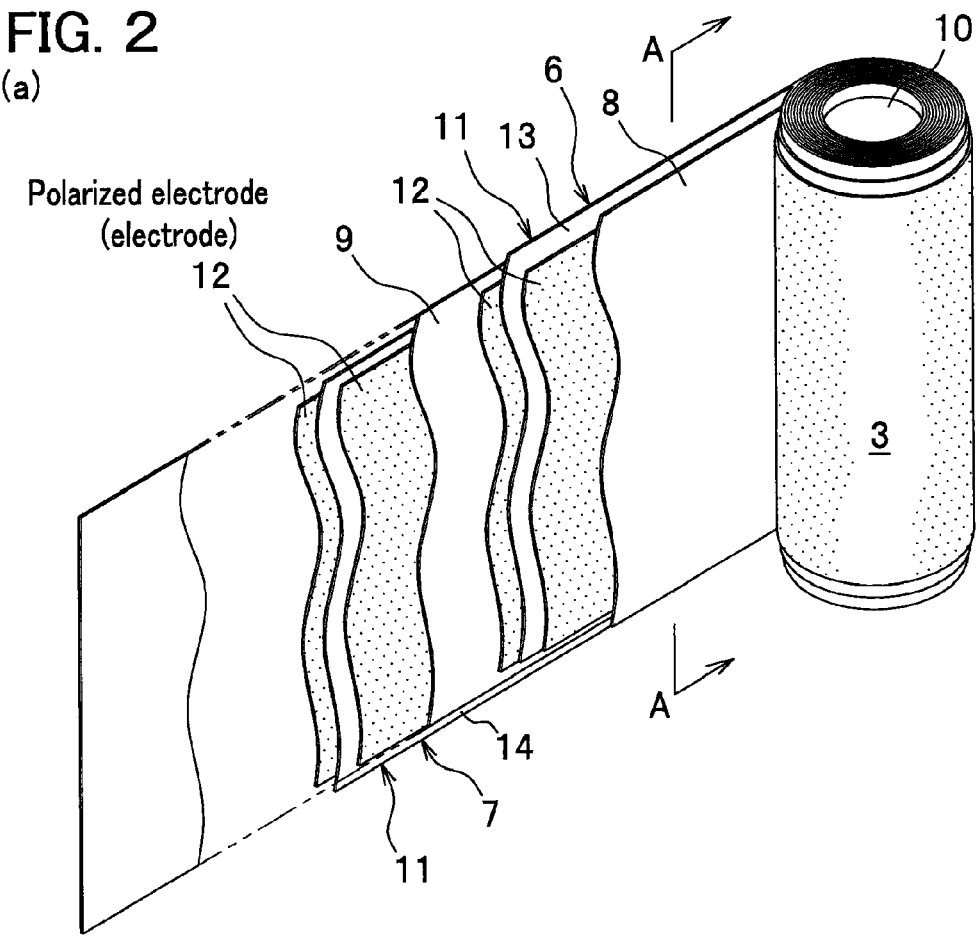
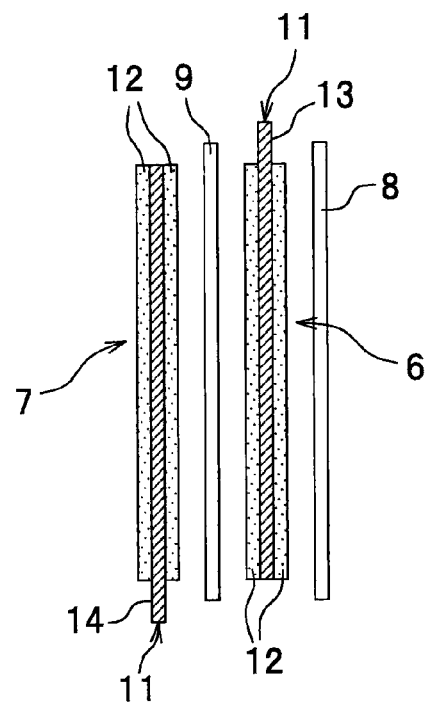

POLARIZED ELECTRODE AND ELECTRIC DOUBLE-LAYER CAPACITOR

CROSS-REFERENCE TO RELATED APPLICATION

This application is a National Stage entry of International Application No. PCT/JP2006/318736 filed Sep. 21, 2006. The disclosure of the prior application is hereby incorporated herein in its entirety by reference.

TECHNICAL FIELD

The present invention relates to a polarized electrode and an electric double-layer capacitor using the same.

BACKGROUND ART

Conventionally, an electric double-layer capacitor having polarized electrodes containing steam activated carbon is known. In this electric double-layer capacitor, steam activated carbon particles are low in conductivity, so that a predetermined conductivity is maintained by adding 2 to 20 mass % of conductive filler (conductive additive) to the polarized electrodes. In this electric double-layer capacitor, the capacitance is further improved, however, recently, improvements in capacitance have reached respective limits. Therefore, an electric double-layer capacitor using alkali activated carbon for a polarized electrode instead of steam activated carbon has been proposed (for example, refer to Japanese Published Unexamined Patent Publication No. 2004-47613). The alkali activated carbon of a graphitizing carbon material has excellent conductivity due to its low porosity and graphitic structure in comparison with steam activated carbon, so that the amount of the conductive filler (conductive additive) to be added to the polarized electrode can be reduced. In comparison with steam activated carbon, the alkali activated carbon has greater ion adsorption to the steam activated carbon due to its pore distribution being sharp and small pore volume, and the capacitance density of the polarized electrode can be increased.

However, the polarized electrode using alkali activated carbon has great ion adsorption, so that the concentration gradient of ions inside the electrode body at the time of discharge is small, and therefore, the diffusion resistance increases. Further, due to expansion of alkali activated carbon when charging, the electrode body expands. As a result, there is a possibility that the gap between activated carbon particles inside the electrode body is limited and hinders ion diffusion inside the electrode body, and the internal resistance increases. Therefore, although the alkali activated carbon has higher conductivity than that of steam activated carbon, the ion diffusion resistance increases, and accordingly, the internal resistance increases. That is to say, the polarized electrode using alkali activated carbon increases in internal resistivity ($\Omega \cdot cm^2$) per a facing electrode area compared to the polarized electrode of the same size using steam activated carbon.

Therefore, an object of the present invention is to provide a polarized electrode with which an electric double-layer capacitor whose internal resistance is small while maintaining excellent capacitance can be manufactured, and the electric double-layer capacitor.

DISCLOSURE OF THE INVENTION

The present invention which solves the above-described problems relates to a polarized electrode containing mixed activated carbon composed of at least two activated carbons, a specific surface area of the mixed activated carbon is not less than 900 $m^2/g$ and less than 1900 $m^2/g$.

In this polarized electrode, a mixed activated carbon composed of at least two activated carbons with specific surface areas different from each other is contained and the specific surface area of the mixed activated carbon is not less than 900 $m^2/g$ and less than 1900 $m^2/g$, so that the resistance reduction ratio rapidly increases in comparison with the conventional one. As a result, according to this polarized electrode, an electric double-layer capacitor whose internal resistance is small while maintaining excellent capacitance can be manufactured.

In this polarized electrode, it is preferable that the mixed activated carbon contains expandable activated carbon and non-expandable activated carbon. Herein, "expandable activated carbon" mentioned in the present invention means activated carbon which expands when a voltage is applied to the polarized electrode in an electrolytic solution, and on the other hand, "non-expandable activated carbon" means activated carbon which does not substantially expand or has expansivity lower than that of expandable activated carbon. A detailed method for identifying the expandable activated carbon and non-expandable activated carbon will be described later.

According to this polarized electrode, an electric double-layer capacitor can be made to more reliably realize excellent capacitance and low internal resistance.

In this polarized electrode, it is preferable that, in a total amount of the mixed activated carbon, the expandable activated carbon is more than 0 mass % and not more than 85 mass %, and the non-expandable activated carbon is not less than 15 mass % and less than 100 mass %.

An electric double-layer capacitor using a polarized electrode containing only expandable activated carbon (graphitizing alkali activated carbon) as activated carbon has a greater capacitance in comparison with an electric double-layer capacitor containing only non-expandable activated carbon (steam activated carbon). Therefore, it is generally expected that the internal resistance of an electric double-layer capacitor containing steam activated carbon and graphitizing alkali activated carbon will be higher than that of an electric double-layer capacitor containing only steam activated carbon.

However, contrary to this expectation, according to a polarized electrode of the present invention, by containing expandable activated carbon and non-expandable activated carbon in the above-described ranges, an electric double-layer capacitor which realizes an internal resistance lower than that of an electric double-layer capacitor having a polarized electrode containing only non-expandable activated carbon (steam activated carbon) can be manufactured.

In the case of the conventional polarized electrode, when the electric double-layer capacitor is used in a low-temperature environment, the viscosity of the electrolytic solution increases and the ion mobility lowers. That is, if such an electric double-layer capacitor having the conventional polarized electrodes is used in a low-temperature environment, combined with the cause described above, the internal resistance further increases. On the other hand, when the polarized electrode of the present invention is used in a low-temperature environment, by using the mixed activated carbon, an electric double-layer capacitor which can maintain a higher capacitance and have a smaller internal resistance than those of the electrode containing only expandable activated carbon (graphitizing alkali activated carbon) can be manufactured.

According to the polarized electrode of the present invention, by using the mixed activated carbon, an electric double-layer capacitor having a greater capacitance than in the case using only non-expandable activated carbon (steam activated carbon) can be manufactured.

By using the mixed activated carbon, the polarized electrode of the present invention can be reduced in the amount of expensive graphitizing alkali activated carbon to be used than in the electrode containing only expandable activated carbon (graphitizing alkali activated carbon), so that the cost can be reduced.

The polarized electrode of the present invention contains expandable activated carbon which is excellent in conductivity (graphitizing alkali activated carbon), so that the use amount of conductive filler to be added to the polarized electrode can be made smaller and the capacitance density ($F/cm^3$) per electrode volume can be made higher than in the polarized electrode containing only non-expandable activated carbon (steam activated carbon).

In this polarized electrode, it is preferable that the particle size ratio ($D1/D2$) of a particle size ($D1$) of the non-expandable activated carbon to a particle size ($D2$) of the expandable activated carbon is 0.3 to 1.0.

According to this polarized electrode, an electric double-layer capacitor can be made to realize excellent capacitance and low internal resistance as described above, and the formability of the polarized electrode can be improved.

In such a polarized electrode, it is preferable that the expandable activated carbon is graphitizing activated carbon, and it is more preferable that the graphitizing activated carbon is activated carbon obtained by alkali-activating a graphite carbon material obtained by applying heat treatment to mesophase pitch. It is still more preferable that the activated carbon obtained by alkali-activating the graphite carbon material obtained by applying heat treatment to the mesophase pitch has a specific surface area not more than 1500 $m^2/g$.

In such a polarized electrode, it is preferable that the non-expandable activated carbon is non-graphitizing activated carbon, and it is preferable that the non-graphitizing activated carbon is a coconut shell activated carbon, phenol resin-based activated carbon, or isotropic pitch-based activated carbon.

The electric double-layer capacitor of the present invention which solves the problems has the above-described polarized electrode.

According to the present invention, a polarized electrode with which an electric double-layer capacitor having a small internal resistance while maintaining excellent capacitance can be manufactured, and the electric double-layer capacitor, can be provided.

BRIEF DESCRIPTION OF THE DRAWINGS

FIG. 2(a) is a perspective view of an electrode winding constituting the cylindrical electric double-layer capacitor of FIG. 1, and FIG. 2(b) is a sectional view along the line A-A of FIG. 2(a);

BEST MODE FOR CARRYING OUT THE INVENTION

Next, an embodiment of the present invention will be described with reference to the drawings as appropriate. Among the drawings to be referred to, FIG. 1 is a sectional view along the central axis of a cylindrical electric double-layer capacitor of this embodiment, FIG. 2(a) is a perspective view of an electrode winding constituting the cylindrical electric double-layer capacitor of FIG. 1, and FIG. 2 (b) is a sectional view along the line A-A of FIG. 2(a).

Figure 1:
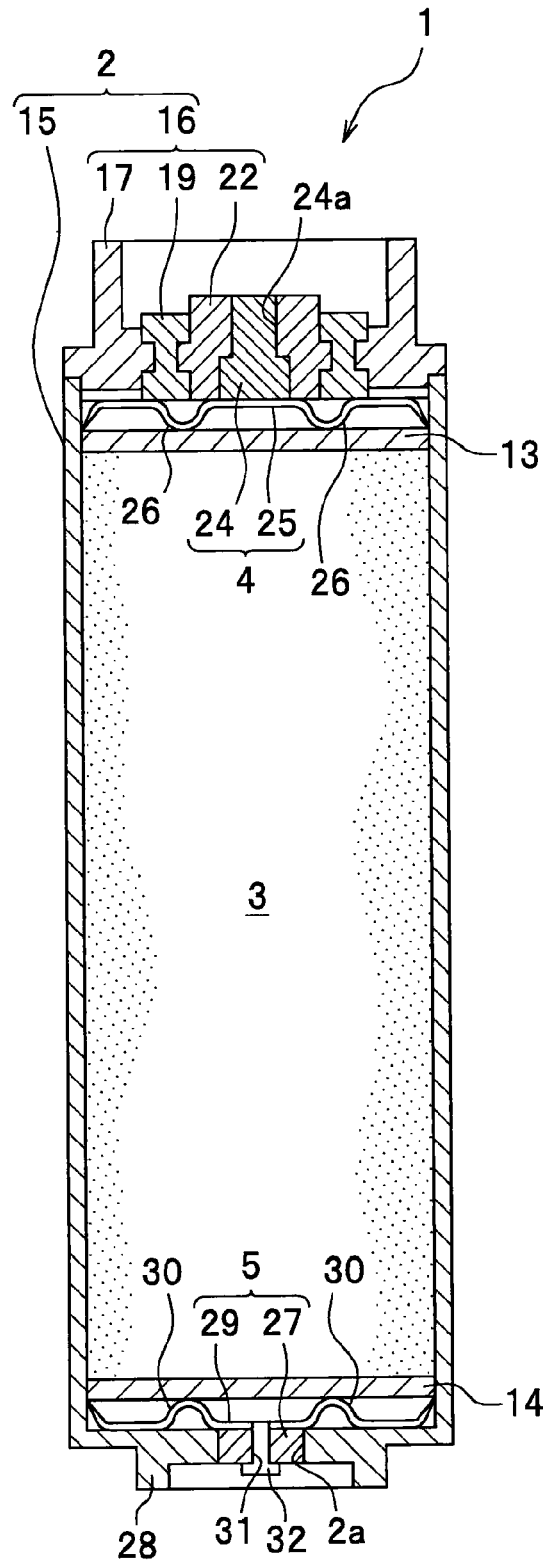
FIG. 1 is a sectional view along the central axis of a cylindrical electric double-layer capacitor of an embodiment.

As shown in FIG. 1, the cylindrical electric double-layer capacitor 1 mainly includes a cylindrical airtight container 2, power collectors 4 and 5 to be housed in the airtight container 2 together with an electrolytic solution that is not shown, and an electrode winding 3.

The airtight container 2 includes a bottomed cylindrical main body 15 and a cover 16 which covers an opening side of this cylindrical main body 15. In the bottom of the cylindrical main body 15, a hole 2a into which a boss 27 of the power collector 5 described later is fitted is formed, and a negative terminal 28 projecting annularly so as to surround the hole 2a is formed.

The cover 16 includes a substantially cylindrical cover main body 17, a substantially cylindrical intermediate member 19 made of an insulating resin, and a substantially cylindrical positive terminal 22.

The cover main body 17 is welded to the opening of the cylindrical main body 15, and on the cover main body 17, the intermediate member 19 and the positive terminal 22 are arranged in this order toward the inner side of the cover, and are fitted to each other liquid-tight.

As a material of this airtight container 2, specifically, of the cylindrical main body 15, a material whose volume change when charging or discharging is not more than 1%, for example, a metal such as Al, Ti, Fe, Cr, Ni, Mn, Ca, Zr, etc., or an alloy containing at least one of these metals is preferably used.

As an electrolyte of the electrolytic solution, a known one can be used, for example, tetraalkyl ammonium salt or amine salt of perchloric acid, hexafluoro phosphoric acid, tetrafluoro boric acid, trifluoroalkyl sulfonic acid, or tetrafluoroalkyl sulfonic acid.

The power collector 4 is made of aluminum, and includes a disk portion 25 and a boss 24 projecting from the center of this disk portion 25. On the disk portion 25, a convex protrusion 26 protruding toward the electrode winding 3 side is formed. This convex protrusion 26 is welded and electrically connected to a connector 13 of a positive electrode 6 (see FIG. 2(a)) described later of the electrode winding 3. The boss 24 is fitted in the inside of the positive terminal 22, that is, the central hole 24a, and is electrically connected to the positive terminal 22 by being welded to the positive terminal 22.

Similar to the power collector 4, a power collector 5 is made of aluminum and includes a disk portion 29 and a boss 27 projecting from the center of the disk portion 29. On the disk portion 29, a convex protrusion 30 protruding toward the electrode winding 3 side is formed. This convex protrusion 30 is welded and electrically connected to a connector 14 of a negative electrode 7 (see FIG. 2(a)) described later of the electrode winding 3. As described above, the boss 27 is fitted in a hole 2a formed in the bottom of the cylindrical main body 15 and electrically connected to the negative terminal 28 by being welded to the bottom of the cylindrical main body 15. In this power collector 5, an electrolytic solution injection hole 31 is formed so as to perforate the boss 27 and the disk portion 29 to make communication between the inside and the outside of the airtight container 2 with each other, and a rubber plug 32 is attached so as to cover the injection hole 31 liquid-tight.

The electrode winding 3 includes, as shown in FIG. 2(a), band-shaped positive electrode 6, negative electrode 7, and separators 8 and 9. In this embodiment, the separator 8, the positive electrode 6, the separator 9, and the negative electrode 7 are laminated in this order, and this lamination is wound in a whorl around a winding core 10 made of aluminum by setting the separator 8 to the inner side. The separator 9 is longer than the negative electrode 7, and the separator 9 extending from the winding end of the negative electrode 7 covers the negative electrode 7 wound on the outermost periphery. Moreover, in FIG. 2(a), a part of the separator 9 is cut-away and a contour thereof is indicated by an alternating long and two short dashed line. It is preferable that the electrode winding 3 is housed without gaps between the same and the inner surface of the cylindrical main body 15.

As the separators 8 and 9, known insulating sheets can be used, for example, sheets made of porous mixed paper or nonwoven fabric obtained by making olefin-based resin (polyethylene, polypropylene), cellulose, polyester, polyalamide, etc., into paper can be used.

The positive electrode 6 and the negative electrode 7 mainly consist of a band-shaped power collecting foil 11 made of aluminum foil and a pair of polarized electrodes 12 formed on both sides of the power collecting foil 11 as shown in FIG. 2(b). These polarized electrodes 12 correspond to "electrode" of the claims.

The polarized electrodes 12 cover substantially the entire surface of the power collecting foil 11 while leaving one edge along the longitudinal direction of the power collecting foil 11, and the edge of the positive electrode 6 which does not have the polarized electrodes 12 forms a connector 13 to be welded to the convex protrusion 26 (see FIG. 1) formed on the disk portion 25 of the power collector 4. In addition, the edge of the negative electrode 7 which does not have the polarized electrode 12 forms a connector 14 to be welded to the convex protrusion 30 (see FIG. 1) formed on the disk portion 29 of the power collector 5.

The polarized electrodes 12 contain activated carbon, conductive filler, and binder described later.

The conductive filler improves a conduction path of the polarized electrodes 12, and as this conductive filler, for example, a conductive fine powder of carbon black, acetylene black, furnace black, natural graphite, artificial graphite, isotropic graphite, mesophase carbon, pitch-based carbon fiber, vapor-grown carbon fiber, nanocarbon, or PAN-based carbon fiber, etc., can be used.

The binder improves the conduction path of the polarized electrodes 12 by binding the conductive filler and activated carbon described next to each other. As this binder, for example, a fluorine resin, etc., of polytetrafluoroethylene (PTFE), ethylene-tetrafluoroethylene copolymer, chlorotrifluoroethylene polymer, vinylidene fluoride polymer, and tetorafluoroethylene-fluoroalkylvinyl ether copolymer, etc., can be used.

Next, activated carbon to be used for the polarized electrodes 12 in this embodiment will be described. This activated carbon is composed of a mixed activated carbon (hereinafter, referred to as "mixed carbon" simply) of at least two carbons with different specific surface areas. The mixed carbon in this embodiment contains expandable activated carbon (hereinafter, referred to as "expandable carbon"), and non-expandable activated carbon (hereinafter, referred to as "non-expandable carbon"). Herein, the "expandable carbon" of the present invention means activated carbon which expands when a voltage is applied to the polarized electrodes 12 in an electrolytic solution, and on the other hand, "non-expandable carbon" means activated carbon which does not substantially expand or has expansivity lower than that of the expandable carbon. As a detailed method for determining whether the activated carbon is an expandable carbon or a non-expandable carbon, if the expansivity of the polarized electrodes 12 composed of 80 mass % of activated carbon to be identified as expandable carbon or non-expandable carbon, 10 mass % of conductive filler, and 10 mass % of binder reach not less than 10% when a voltage of 3V is applied to the polarized electrodes in an electrolytic solution, this activated carbon can be identified as "expandable carbon." If the expansivity of the polarized electrode 12 is 0%, less than 10%, or preferably, not more than 5%, the activated carbon is identified as "non-expandable carbon."

In a total amount of mixed carbon containing these expandable carbon and non-expandable carbon, it is preferable that the content of expandable carbon is more than 0 mass % and not more than 85 mass %, and the content of the non-expandable carbon is not less than 15 mass % and less than 100 mass %. A more preferable content of expandable carbon is not less than 10 mass % and not more than 67 mass %, a more preferable content of non-expandable carbon is not less than 33 mass % and not more than 90 mass %, a still more preferable content of expandable carbon is not less than 10 mass % and not more than 60 mass %, a still more preferable content of non-expandable carbon is not less than 40 mass % and not more than 90 mass %, and the most preferable content of expandable carbon is not less than 10 mass % and not more than 50 mass %, and the most preferable content of non-expandable carbon is not less than 50 mass % and not more than 90 mass %. Moreover, by setting the content of the expandable carbon to not less than 10 mass %, when charging, the polarized electrodes 12 expand and become close to the power collecting foil 11. As a result, the contact resistance between the polarized electrodes 12 and the power collecting foil 11 is more effectively reduced.

It is preferable that the particle size ratio (D1/D2) of the particle size (D1) of the non-expandable carbon to the particle size (D2) of the expandable carbon is 0.3 to 1.0. In this connection, the polarized electrodes 12 containing the expandable carbon and non-expandable carbon in this particle size ratio are excellent in formability.

The specific surface area of the expandable carbon is preferably not more than 2000 $m^2/g$, and more preferably not more than 1500 $m^2/g$ and not less than 300 $m^2/g$. Expandable carbon with a specific surface area not more than 2000 $m^2/g$ effectively realizes a reduction in internal resistance and a capacitance increase in the polarized electrode 12. Expandable carbon with a specific surface area not more than 1500 $m^2/g$ and not less than 300 $m^2/g$ can reduce the use amount of the electrolytic solution in the cylindrical electric double-layer capacitor 1.

The specific surface area of non-expandable carbon is not especially limited, however, non-expandable carbon with a specific surface area of about 1200 to 2500 $m^2/g$ is preferably used. The expandable carbon and the non-expandable carbon may be products available on the market.

For mixing the expandable carbon and the non-expandable carbon, a dry mixing method or a wet mixing method using a blender or mixer may be used. The method in which non-expandable carbon is mixed in an aqueous slurry at the stage of washing of expandable carbon described later can also be used. As described later, when a kneaded material is coated on the power collecting foil 11 (see FIG. 2(a)) to form the polarized electrodes 12, a method in which the expandable carbon and non-expandable carbon are mixed during preparation of this kneaded material can also be used.

The specific surface area of mixed carbon obtained by the thus mixing expandable carbon and non-expandable carbon is not less than 900 $m^2/g$ and less than 1900 $m^2/g$, more preferably, not less than 1200 $m^2/g$ and less than 1900 $m^2/g$.

As the expandable carbon in this embodiment, graphitizing activated carbon is used, and as the non-expandable carbon, non-graphitizing activated carbon is used. As the graphitizing activated carbon, graphitizing alkali activated carbon can be used, and as non-graphitizing activated carbon, non-graphitizing steam activated carbon or non-graphitizing alkali activated carbon can be used.

Graphitizing alkali activated carbon is obtained by alkali-activating a graphitizing carbon material.

As the graphitizing carbon material, for example, a graphite carbon material obtained by applying heat treatment to mesophase pitch, distilled pitch of petroleum or coal, coke, chemosynthetic pitch, polyvinyl chloride (PVC) pitch, etc., can be used. As an alkali activating method, a known method including a step of alkali-treating a graphitizing carbon material with alkali metal hydroxide, and a step of washing the alkali-treated graphitizing carbon material can be used, and for example, the methods described in Japanese Published Unexamined Patent Publication Nos. 2002-15958, 2002-134369, H09-275042, H01-139865, and H10-121336, etc., can be preferably used. In particular, activated carbon obtained by alkali-activating a graphite carbon material obtained by applying heat treatment to mesophase pitch is preferable as the graphitizing alkali activated carbon.

The non-graphitizing steam activated carbon is obtained by steam activating a non-graphitizing carbon material, and the non-graphitizing alkali activated carbon is obtained by alkali-activating a non-graphitizing carbon material.

As the non-graphitizing carbon material, a material with an isotropic carbon structure can be used, and for example, cellulose such as a coconut shell or wood, a carbon material obtained from a thermosetting resin such as phenol resin, and a carbon material such as isotropic pitch can be used. As a steam activating method, a known method can be used, and for example, a method in which a non-graphitizing carbon material is heated at approximately 850° C. under the presence of steam can be used. As an alkali activating method, the methods described above can be used. In particular, a coconut shell activated carbon, phenol resin-based activated carbon, and isotropic pitch-based activated carbon obtained by steam activating or alkali activating a coconut shell, phenol resin, and isotropic pitch carbon material are preferable as the non-graphitizing activated carbon.

Next, a working effect of the cylindrical electric double-layer capacitor 1 of this embodiment will be described with reference to FIG. 1 mainly.

In this cylindrical electric double-layer capacitor 1, charging and discharging is performed via the positive terminal 22 and the negative terminal 28. That is to say, by connecting a predetermined power supply and load not shown to the positive terminal 22 and the negative terminal 28, a current circuit passing through the power collector 4 (boss 24, disk portion 25), the positive electrode 6, the negative electrode 7, and the power collector 5 (boss 27, disk portion 29) is formed.

In this cylindrical electric double-layer capacitor 1, when charging, electrolytic ions enter the insides of pores of the non-expandable carbon (non-graphitizing activated carbon) and expandable carbon (graphitizing alkali activated carbon) contained in the polarized electrode 12 (see FIG. 2), and the ions are adsorbed on the surfaces of these activated carbons. As a result, the polarized electrode 12 is provided with an electric double-layer capacitor, whereby the cylindrical electric double-layer capacitor 1 performs a power storage function. Then, when discharging, the electrolytic ions are desorbed from the pores of activated carbons.

In this cylindrical electric double-layer capacitor 1, mixed carbon containing non-expandable carbon (non-graphitizing activated carbon) and expandable carbon (graphitizing alkali activated carbon) is used for the polarized electrode 12, and the specific surface area of this mixed activated carbon is in the above-described range, so that when charging or discharging, the resistance reduction ratio rapidly increases compared to the conventional ratio. As a result, the cylindrical electric double-layer capacitor 1 is small in internal resistance while having excellent capacitance.

According to this cylindrical electric double-layer capacitor 1, the mixed activated carbon contains expandable carbon and non-expandable carbon, so that excellent capacitance and low internal resistance are more reliably realized.

Further, in this cylindrical electric double-layer capacitor 1, when charging or discharging, non-expandable carbon (non-graphitizing activated carbon) and expandable carbon (graphitizing alkali activated carbon) are contained at the above-described contents, so that a low internal resistance is realized while maintaining excellent capacitance. In addition, the internal resistance is lower than in the conventional cylindrical electric double-layer capacitor containing only steam activated carbon.

In addition, in the cylindrical electric double-layer capacitor 1, when charging, according to expansion of expandable carbon (graphitizing alkali activated carbon) contained in the polarized electrode 12, the polarized electrode 12 and the power collecting foil 11 become close to each other. As a result, in the cylindrical electric double-layer capacitor 1, the contact resistance between polarized electrode 12 and the power collecting foil 11 is reduced, so that an internal resistance lower than in the conventional cylindrical electric double-layer capacitor containing only steam activated carbon is realized.

When the cylindrical electric double-layer capacitor 1 is used in a low-temperature environment, a greater capacitance can be maintained and a smaller internal resistance is realized than in the conventional cylindrical electric double-layer capacitor containing only graphitizing alkali activated carbon.

The cylindrical electric double-layer capacitor 1 is more inexpensive than the conventional cylindrical electric double-layer capacitor containing only expensive graphitizing alkali activated carbon. Different from the conventional cylindrical electric double-layer capacitor containing only steam activated carbon, it is not necessary to use a large amount of conductive filler to increase the conductivity of the polarized electrode 12.

In the cylindrical electric double-layer capacitor 1, the positive electrode 6, the negative electrode 7, and the separators 8 and 9 are wound, and the widths and lengths of the positive electrode 6 and the negative electrode 7 can be easily adjusted, so that the performance of the cylindrical electric double-layer capacitor 1 can be easily adjusted.

In the cylindrical electric double-layer capacitor 1, by increasing the winding strength of the positive electrode 6, the negative electrode 7, and the separators 8 and 9, the polarized electrodes 12 can be consolidated. As a result, according to this cylindrical electric double-layer capacitor 1, the activated carbon packing ratio can be improved.

In the cylindrical electric double-layer capacitor 1, the polarized electrode 12 contains expandable carbon (graphitizing alkali activated carbon) with the above-described specific surface area, so that the internal resistance is more effectively reduced and the capacitance is more effectively increased. The expandable carbon (graphitizing alkali activated carbon) with said specific surface area is used for the polarized electrode 12, so that in the cylindrical electric double-layer capacitor 1, the amount of the electrolyte solution used can be reduced, and this contributes to cost reduction.

The present invention is not limited to the above-described embodiment, and carried out in various modes.

In the above-described embodiment, the separators 8 and 9 are used one each, however, the numbers of separators may be plural.

In the above-described embodiment, the separator 8, the positive electrode 6, the separator 9, and the negative electrode 7 are laminated in this order, and this lamination is wound around a winding core 10 to form an electrode winding 3, however, the present invention is not limited to this, and it is also allowed that an electrode winding 3 that is formed by winding a lamination including a third separator not shown arranged on the outside of the negative electrode 7 around a winding core 10 is provided.

Figure 10:
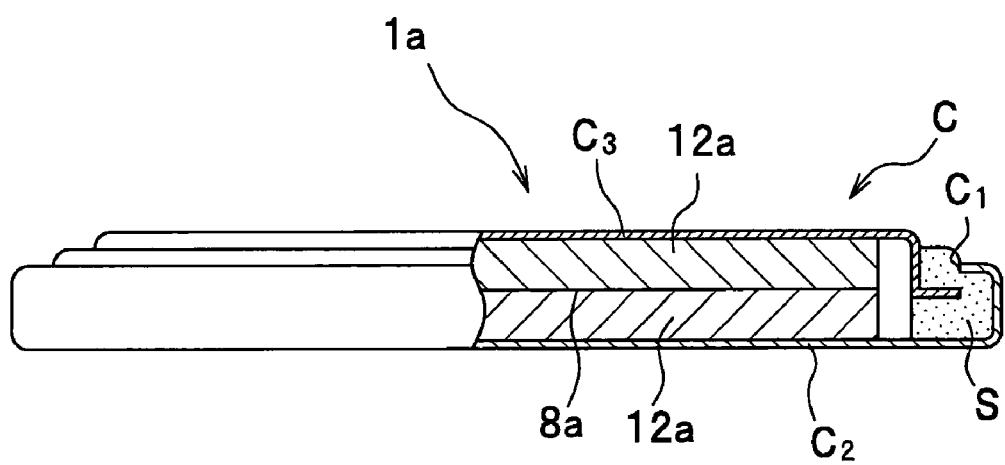
FIG. 10 is a partial sectional view of a button type electric double-layer capacitor, showing an electric double-layer capacitor of another embodiment.

In the above-described embodiment, the cylindrical electric double-layer capacitor 1 is described, however, the present invention is not limited to this, and may be, for example, a button type electric double-layer capacitor 10. FIG. 10 is a partial sectional view of the button type electric double-layer capacitor. As shown in FIG. 10, the button type electric double-layer capacitor 1a includes a case C, a pair of polarized electrodes 12a housed inside this case C, a spacer 8a sandwiched between the polarized electrodes 12a, and an electrolytic solution (not shown) filled in the case C. The case C consists of an aluminum-made case body C2 having an opening C1 and a cover plate C3 made of aluminum covering the opening C1, and the outer peripheral portion of the cover plate C3 and the inner peripheral portion of the case body C2 are sealed to each other by a sealing material S. The polarized electrodes 12a of this button type electric double-layer capacitor 1a are constructed similar to the polarized electrodes 12 of the cylindrical electric double-layer capacitor 1 of the aforementioned embodiment.

In the electric double-layer capacitor of the prevent invention, a cubic or rectangular-parallelepiped electrode lamination in which a positive electrode and a negative electrode including the polarized electrodes, and separators are laminated may be applied to a stack-type electric double-layer capacitor with a known structure housed in a predetermined case together with an electrolytic solution, although this is not shown. In the case of this stack-type electric double-layer capacitor, when a capacitor module is formed by connecting a plurality of stack-type electric double-layer capacitors, the volumetric efficiency thereof is improved in comparison with a capacitor module obtained by connecting the cylindrical electric double-layer capacitors 1 described above.

EXAMPLES

Next, the present invention will be described in greater detail while showing examples.

Example 1

In this example, the cylindrical electric double-layer capacitor 1 shown in FIG. 1 was manufactured, and for this cylindrical electric double-layer capacitor 1, an initial performance test and an accelerated endurance test described later were conducted.

<Manufacturing of Electrode Winding>

First, a graphite carbon material obtained by applying heat treatment to mesophase pitch was alkali-activated with potassium hydroxide, and then washed to prepare expandable carbon (graphitizing alkali activated carbon). The alkali activating method used herein is the method disclosed in Japanese Published Unexamined Patent Publication No. 2002-134369. The specific surface area of the obtained graphitizing alkali activated carbon was 790 $m^2/g$, the pore volume (micropore volume) was 0.35 ml/g, the entire surface functional group amount was 0.7 meq/g, the K (potassium) amount was 200 ppm, and the average particle size was 10 micrometers.

The specific surface area and the pore volume were measured by using a nitrogen gas adsorption method after vacuum-deaerating approximately 0.5 g of each activated carbon sample for 6 hours at 300° C. At this time, a micropore volume not more than 2 nm in diameter was obtained by using the "t-plot method" (refer to B. C. Lippens, J. H. de Boer, J. Catalysis, 4,319 (1965)).

The surface functional group amount of activated carbon can be quantified by using a generally known method (for example, refer to "Hyomen Vol. 34, No. 2 (1996)," and "Catal. 16, 179 (1966), etc.). In detail, the surface functional group amount can be quantified by putting 2 g each of activated carbon samples in 100 ml Erlenmeyer flasks, adding 50 ml of a decinormal (N) alkali reagent (sodium ethoxide) into the flasks, filtrating after 24-hour shaking, and titrating unreacted alkali reagent with decinormal (N) hydrochloric acid.

The K amount was quantified from a solution of ash obtained by heating each 20 g of the activated carbon samples in the air at 700° C. for not less than 48 hours by using atomic absorption spectrometry.

Next, non-expandable carbon (non-graphitizing steam activated carbon) was prepared. This non-graphitizing steam activated carbon (YP17 manufactured by KURARAY CHEMICAL CO., LTD.) had an average particle size of 6 micrometers, and the specific surface area measured by using said method was 1680 m$^2$/g. Then mixed carbon containing 10 mass % of expandable carbon (graphitizing alkali activated carbon) and 90 mass % of non-expandable carbon (non-graphitizing steam activated carbon: YP17 manufactured by KURARAY CHEMICAL CO., LTD., average particle size: 6 micrometers) was prepared. The specific surface area of this mixed carbon was measured according to said method, and was 1591 m$^2$/g.

Then, polarized electrodes 12 (see FIG. 2(a)) with a thickness of 140 micrometers were manufactured by rolling a kneaded material containing 90 parts by mass of the prepared mixed carbon, 5 parts by mass of acetylene black (denka black manufactured by DENKI KAGAKU KOGYO KABUSHIKI KAISYA), and 5 parts by mass of polytetrafluoroethylene. Then, by bonding the polarized electrodes 12 to both sides of the power collecting foil 11 (see FIG. 2(a)) made of aluminum foil by using a conductive bonding agent, the positive electrode 6 and the negative electrode 7 were manufactured (see FIG. 2(b)). It is also allowed that the polarized electrodes 12 are formed by coating a fluidized kneaded material on the power collecting foil 11 and solidifying (curing) this kneaded object.

Next, the manufactured positive electrode 6 and negative electrode 7 and nonwoven fabric (separators 8 and 9) made of polyester-based resin were laminated as shown in FIG. 2(a), and this lamination was wound around the aluminum-made winding core 10, whereby the electrode winding 3 was manufactured.

<Preparation of Electrolytic Solution>

A 1.8 mol/l solution of propylene carbonate using triethylmethylammonium tetrafluoroborate [$(C_2H_5)_3CH_3NBF_4$] as electrolyte was prepared as the electrolytic solution. A moisture content in this electrolytic solution was not more than 30 ppm.

<Manufacturing of Cylindrical Electric Double-Layer Capacitor>

The manufactured electrode winding 3 was housed in the cylindrical airtight container 2 (diameter: 40 mm, height: 120 mm) made of aluminum, and then vacuum-dried at 160° C. Then, by injecting the prepared electrolytic solution into this airtight container 2, the cylindrical electric double-layer capacitor 1 shown in FIG. 1 was manufactured.

<Initial Performance Test of Cylindrical Electric Double-Layer Capacitor>

Aging was performed by applying a constant voltage of 2.7V to the manufactured cylindrical electric double-layer capacitor 1 for 6 hours while keeping the temperature of the cylindrical electric double-layer capacitor 1 at 65° C. in a constant-temperature bath. Thereafter, 30 A constant current discharge was performed at 25° C. to measure the initial capacitance and the initial actual internal resistance of the cylindrical electric double-layer capacitor 1 according to an energy conversion method. The results of these are shown in Table 1. The arithmetic average of the internal resistance calculated from the resistances of the used expandable carbon and non-expandable carbon (hereinafter, referred to as "resistance arithmetic average" simply), and a reduction ratio from this resistance arithmetic average to the actual internal resistance (hereinafter, referred to as "resistance reduction ratio" simply) are shown in Table 1.

<Accelerated Endurance Test of Cylindrical Electric Double-Layer Capacitor>

After the initial performance test was conducted, an accelerated endurance test was conducted by applying a constant voltage of 2.7V to the cylindrical electric double-layer capacitor 1 for 1000 hours while the temperature of the cylindrical electric double-layer capacitor 1 was maintained at 65° C. in the constant-temperature bath. Thereafter, a constant current of 30 A was discharged at 25° C. and the capacitance and the actual internal resistance of the cylindrical electric double-layer capacitor 1 were measured according to the energy conversion method. Then, the capacitance change after the accelerated endurance test from the initial capacitance and the actual internal resistance change after the accelerated endurance test from the initial actual internal resistance were obtained. The results of these are shown in Table 1. In Table 1, these evaluations after the accelerated endurance test are expressed as "performance after endurance test."

TABLE 1

|  | Expandable carbon | | | Non-expandable carbon | | | Mixed carbon |
|---|---|---|---|---|---|---|---|
|  | Content (mass %) | Specific surface area m$^2$/g | Particle size (μm) | Content (mass %) | Specific surface area m$^2$/g | Particle size (μm) | Specific surface area m$^2$/g |
| Example 1 | 10 | 790 | 10 | 90 | 1680 | 6 | 1591 |
| Example 2 | 20 | 790 | 10 | 80 | 1680 | 6 | 1502 |
| Example 3 | 33 | 790 | 10 | 67 | 1680 | 6 | 1386 |
| Example 4 | 50 | 790 | 10 | 50 | 1680 | 6 | 1235 |
| Example 5 | 67 | 790 | 10 | 33 | 1680 | 6 | 1084 |
| Example 6 | 50 | 790 | 10 | 50 | 1680 | 6 | 1235 |
| Example 7 | 33 | 790 | 10 | 67 | 1680 | 6 | 1386 |
| Example 8 | 67 | 790 | 10 | 33 | 1680 | 6 | 1084 |
| Example 9 | 80 | 790 | 10 | 20 | 1680 | 6 | 968 |

TABLE 1-continued

| | | | | | | | |
|---|---|---|---|---|---|---|---|
| Example 10 | 20 | 790 | 10 | 80 | 1680 | 6 | 1502 |
| Example 11 | 33 | 790 | 6 | 67 | 1680 | 6 | 1386 |
| Example 12 | 33 | 790 | 2 | 67 | 1680 | 6 | 1386 |
| Example 13 | 33 | 790 | 2 | 67 | 1680 | 2 | 1386 |
| Example 14 | 33 | 790 | 10 | 67 | 1680 | 2 | 1386 |
| Example 15 | 33 | 790 | 10 | 67 | 2200 | 13 | 1735 |
| Example 16 | 33 | 790 | 10 | 67 | 2060 | 10 | 1641 |
| Example 17 | 33 | 790 | 6 | 67 | 2200 | 13 | 1735 |
| Example 18 | 33 | 790 | 6 | 67 | 2060 | 10 | 1641 |
| Comparative Example 1 | 0 | | | 100 | 1680 | 6 | 1680 |
| Comparative Example 2 | 100 | 790 | 10 | 0 | | 6 | 790 |
| Comparative Example 3 | 33 | 2500 | 10 | 67 | 1680 | 6 | 1951 |
| Comparative Example 4 | 0 | | | 100 | 1680 | 6 | 1680 |
| Comparative Example 5 | 100 | 790 | 10 | 0 | | 6 | 790 |
| Comparative Example 6 | 100 | 790 | 6 | 0 | | | 790 |
| Comparative Example 7 | 100 | 790 | 2 | 0 | | | 790 |
| Comparative Example 8 | 0 | | | 100 | 1680 | 2 | 1680 |
| Comparative Example 9 | 0 | | | 100 | 2050 | 6 | 2050 |
| Comparative Example 10 | 100 | 2100 | 10 | 0 | | 0 | 2100 |
| Comparative Example 11 | 33 | 2100 | 10 | 67 | 2050 | 6 | 2067 |
| Comparative Example 12 | 0 | | | 100 | 2200 | 13 | 2200 |
| Comparative Example 13 | 33 | 2100 | 10 | 67 | 2200 | 13 | 2167 |
| Comparative Example 14 | 0 | | | 100 | 2060 | 10 | 2060 |

| | Initial performance | | | | Performance after endurance test | | | Actual |
|---|---|---|---|---|---|---|---|---|
| | Capacitance (F) | Actual internal resistance (mΩ) | Resistance arithmetic average (mΩ) | Resistance reduction ratio (%) | Capacitance (F) | Actual internal resistance (mΩ) | Capacitance change (%) | internal resistance change (%) |
| Example 1 | 1300 | 2.42 | 2.78 | 12.9 | 1147 | 3.42 | 88.2 | 141 |
| Example 2 | 1386 | 2.38 | 2.86 | 16.8 | 1247 | 2.85 | 90.0 | 120 |
| Example 3 | 1494 | 2.30 | 2.96 | 22.3 | 1357 | 2.64 | 90.8 | 115 |
| Example 4 | 1635 | 2.43 | 3.10 | 21.6 | 1478 | 2.87 | 90.4 | 118 |
| Example 5 | 1776 | 3.08 | 3.24 | 4.9 | 1600 | 4.16 | 90.1 | 135 |
| Example 6 | 1586 | 2.41 | 3.10 | 22.3 | | | | |
| Example 7 | 1494 | 2.30 | 2.96 | 22.3 | | | | |
| Example 8 | 1770 | 2.52 | 3.24 | 22.2 | | | | |
| Example 9 | 1885 | 2.64 | 3.34 | 21.0 | | | | |
| Example 10 | 1386 | 2.41 | 2.86 | 15.7 | | | | |
| Example 11 | 1494 | 2.02 | 2.96 | 31.8 | | | | |
| Example 12 | 1517 | 1.74 | 2.92 | 40.4 | | | | |
| Example 13 | 1494 | 2.24 | 2.89 | 22.5 | | | | |
| Example 14 | 1494 | 2.30 | 2.93 | 21.5 | | | | |
| Example 15 | 1220 | 2.52 | 3.14 | 19.7 | | | | |
| Example 16 | 2050 | 2.52 | 3.19 | 21.0 | | | | |
| Example 17 | 2050 | 2.08 | 3.14 | 33.8 | | | | |
| Example 18 | 2050 | 2.02 | 3.19 | 36.7 | | | | |
| Comparative Example 1 | 1220 | 2.70 | | | 1061 | 3.92 | 87.0 | 145 |
| Comparative Example 2 | 2050 | 3.50 | | | 1810 | 5.43 | 88.3 | 155 |
| Comparative Example 3 | 1279 | 2.68 | 2.96 | 9.5 | 1113 | 3.64 | 87.0 | 136 |
| Comparative Example 4 | 1220 | 2.70 | | | | | | |
| Comparative Example 5 | 2050 | 3.50 | | | | | | |
| Comparative Example 6 | 2050 | 3.50 | | | | | | |
| Comparative Example 7 | 2050 | 3.38 | | | | | | |
| Comparative Example 8 | 1220 | 2.65 | | | | | | |
| Comparative Example 9 | 827 | 2.64 | | | | | | |
| Comparative Example 10 | 1609 | 3.48 | | | | | | |
| Comparative Example 11 | 1080 | 2.86 | 2.92 | 2.1 | | | | |
| Comparative Example 12 | 1746 | 2.97 | | | | | | |
| Comparative Example 13 | 1746 | 3.09 | 3.14 | 1.6 | | | | |
| Comparative Example 14 | 1746 | 3.03 | | | | | | |

Examples 2 through 5

A cylindrical electric double-layer capacitor 1 was manufactured in the same manner as in Example 1 except that mixed carbon was prepared by changing the proportions of expandable carbon and non-expandable carbon in the mixed carbon used for manufacturing the polarized electrodes 12 as shown in Table 1. The specific surface area of the mixed carbon measured according to the aforementioned method is shown in Table 1. In the same manner as in Example 1, the initial capacitance, the initial actual internal resistance, the capacitance after the accelerated endurance test, the actual internal resistance after the accelerated endurance test, the capacitance change after the accelerated endurance test from the initial capacitance, and the actual internal resistance change after the accelerated endurance test from the initial actual internal resistance of cylindrical double-layer capacitor 1 were obtained. The results of these are shown in Table 1. The resistance arithmetic average and the resistance reduction ratio obtained in the same manner as in Example 1 are shown in Table 1.

For the cylindrical electric double-layer capacitor 1 of Example 3, the following low-temperature performance test was conducted.

<Low-temperature Performances Test>

Figure 8:
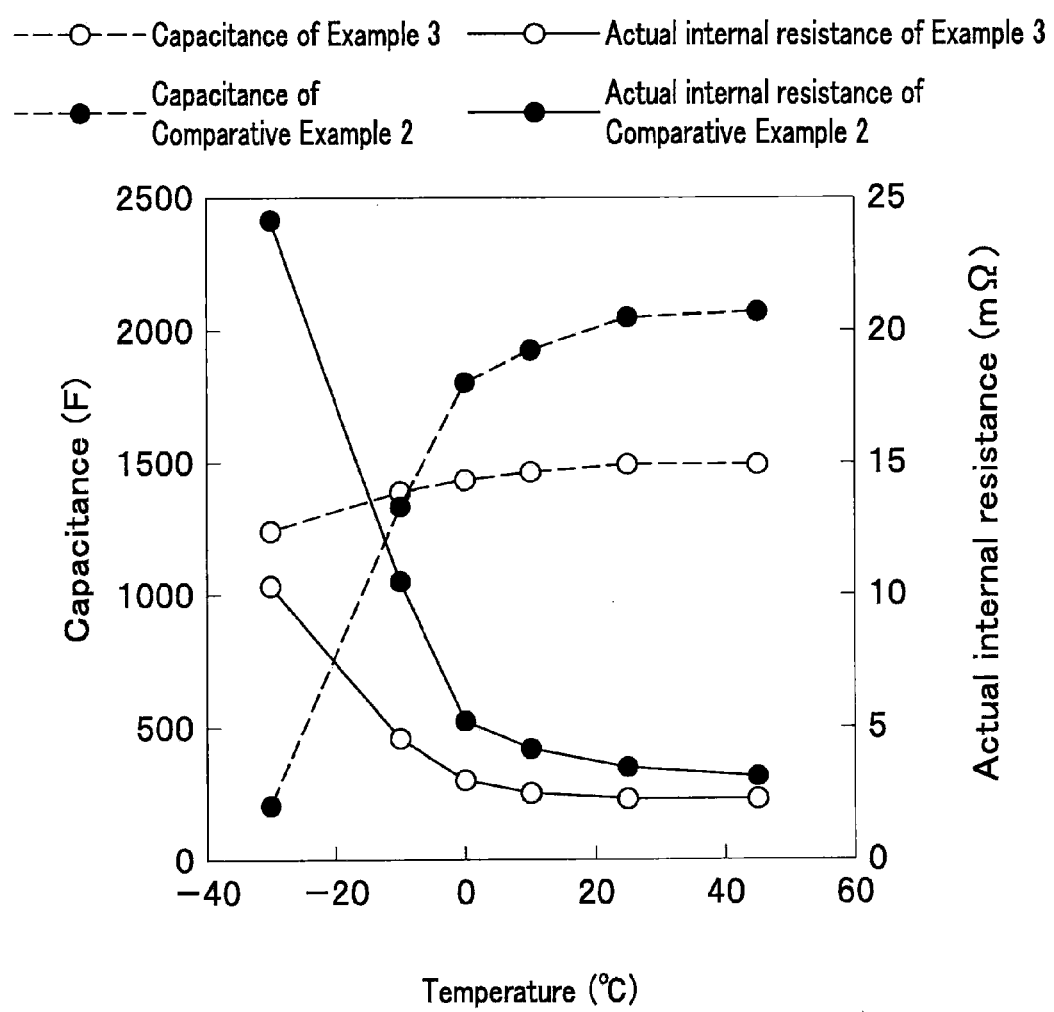
FIG. 8 is a graph showing a relationship between the temperature and the capacitance and actual internal resistance of a cylindrical electric double-layer capacitor, where the horizontal axis indicates the temperature (° C.), the left vertical axis indicates the capacitance (F), and the right vertical axis indicates the actual internal resistance (m$\Omega$)

After the cylindrical electric double-layer capacitor 1 was kept at a predetermined temperature set in the range of −40° C. to 45° C. for not less than 6 hours, while keeping the temperature, the capacitance and the actual internal resistance of the cylindrical electric double-layer capacitor 1 at the temperature were measured. The results of these are shown in Table 2 and FIG. 8. In FIG. 8, the horizontal axis indicates the temperature (° C.), the left vertical axis indicates the capacitance (F), and the right vertical axis indicates the actual internal resistance (mΩ).

TABLE 2

| | Temperature (° C.) | Capacitance (F) | Actual internal resistance (mΩ) |
|---|---|---|---|
| Example 3 | 45 | 1494 | 2.30 |
| | 25 | 1494 | 2.30 |
| | 10 | 1464 | 2.52 |
| | 0 | 1434 | 3.01 |
| | −10 | 1389 | 4.59 |
| | −30 | 1240 | 10.33 |
| Comparative Example 2 | 45 | 2071 | 3.15 |
| | 25 | 2050 | 3.50 |
| | 10 | 1927 | 4.20 |
| | 0 | 1804 | 5.25 |
| | −10 | 1333 | 10.50 |
| | −30 | 205 | 24.15 |

Comparative Example 1

A polarized electrode 12 (molding density: 0.64 g/cm$^3$) with a thickness of 140 micrometers was manufactured by rolling a kneaded object containing 84 parts by mass of non-graphitizing steam activated carbon (YP17 manufactured by KURARAY CHEMICAL CO., LTD, average particle size: 6 micrometers) as non-expandable carbon, 10 parts by mass of acetylene black (denka black manufactured by DENKI KAGAKU KOGYO KABUSHIKI KAISYA), and 6 parts by mass of polytetrafluoroethylene. A cylindrical electric double-layer capacitor 1 was manufactured in the same manner as in Example 1 except that these polarized electrodes 12 were used. Then, in the same manner as in Example 1, the initial capacitance, the initial actual internal resistance, the capacitance after the accelerated endurance test, the actual internal resistance after the accelerated endurance test, the capacitance change after the accelerated endurance test from the initial capacitance, and the actual internal resistance change after the accelerated endurance test from the initial actual internal resistance of the cylindrical electric double-layer capacitor 1 were obtained. The results of these are shown in Table 1.

Comparative Example 2

Polarized electrodes (molding density: 0.86 g/cm$^3$) with a thickness of 140 micrometers were manufactured by rolling a kneaded object composed of 90 parts by mass of graphitizing alkali activated carbon as expandable carbon obtained in Example 1, 5 parts by mass of acetylene black (denka black manufactured by DENKI KAGAKU KOGYO KABUSHIKI KAISYA), and 5 parts by mass of polytetrafluoroethylene. A cylindrical electric double-layer capacitor 1 was manufactured in the same manner as in Example 1 except that this polarized electrode 12 was used. The specific surface area of the mixed carbon measured according to the aforementioned method is shown in Table 1. Then, in the same manner as in Example 1, the initial capacitance, the initial actual internal resistance, the capacitance after the accelerated endurance test, the actual internal resistance after the accelerated endurance test, the capacitance change after the accelerated endurance test from the initial capacitance, and the actual internal resistance change after the accelerated endurance test from the initial actual internal resistance of the cylindrical electric double-layer capacitor 1 were obtained. The results of these are shown in Table 1. Then, the same low-temperature performance test as in Example 3 was conducted. The results of these are shown in Table 2 and FIG. 8.

Comparative Example 3

A graphite carbon material obtained by applying heat treatment to coal coke was alkali-activated with potassium hydroxide and then washed, whereby expandable carbon (graphitizing alkali activated carbon) with a specific surface area of 2500 m$^2$/g was prepared. The alkali activating method used herein is the method disclosed in Japanese Laid-Open Patent Publication No. S63-78513. A cylindrical electric double-layer capacitor 1 was manufactured by preparing mixed carbon in the same manner as in Example 3 except that expandable carbon obtained in this example was used instead of the expandable carbon used in Example 3. The specific surface area of the mixed carbon measured according to the aforementioned method is shown in Table 1. Then, in the same manner as in Example 1, the initial capacitance, the initial actual internal resistance, the capacitance after the accelerated endurance test, the actual internal resistance after the accelerated endurance test, the capacitance change after the accelerated endurance test from the initial capacitance, and the actual internal resistance change after the accelerated endurance test from the initial actual internal resistance of the cylindrical electric double-layer capacitor 1 were obtained. The results of these are shown in Table 1. In addition, the resistance arithmetic average and the resistance reduction ratio obtained in the same manner as in Example 1 are shown in Table 1.

Example 6

A cylindrical electric double-layer capacitor 1 was manufactured in the same manner as in Example 1 except that mixed carbon was prepared with the proportions shown in Table 1 of non-graphitizing steam activated carbon (YP50F manufactured by KURARAY CHEMICAL CO., LTD., average particle size: 6 micrometers, specific surface area: 1680 m$^2$/g) as non-expandable carbon obtained by steam activating a carbonized coconut shell and graphitizing alkali activated carbon (NK330 manufactured by KURARAY CHEMICAL CO., LTD., average particle size: 10 micrometers, specific surface area: 790 m$^2$/g) obtained by alkali-activating a graphite carbon material (H/C=0.25) obtained by applying heat treatment to mesophase pitch made of carboniferous heavy oil. The specific surface area of the mixed carbon measured according to the aforementioned method is shown in Table 1. Then, in the same manner as in Example 1, the initial capacitance and the initial actual internal resistance of the cylindrical electric double-layer capacitor 1 were obtained. The results of these are shown in Table 1. In addition, the resistance arithmetic average and the resistance reduction ratio obtained in the same manner as in Example 1 are shown in Table 1.

Examples 7 through 10

A cylindrical electric double-layer capacitor 1 was manufactured in the same manner as in Example 1 except that the proportions of the expandable carbon and the non-expandable carbon in the mixed carbon used in Example 6 were changed as shown in Table 1. The specific surface area of the mixed carbon measured according to the aforementioned method is shown in Table 1. Then, in the same manner as in Example 1, the initial capacitance and the initial actual internal resistance of the cylindrical electric double-layer capacitor 1 were obtained. The results of these are shown in Table 1. In addition, the resistance arithmetic average and the resistance reduction ratio obtained in the same manner as in Example 1 are shown in Table 1.

Example 11

Expandable carbon with an average particle size of 6 micrometers was obtained by grinding the graphitizing alkali activated carbon as expandable carbon used in Example 6 for 30 minutes at 200 rpm by using a planetary ball mill (planetary ball mill P-6 manufactured by Fritsch Japan Co., Ltd.). A cylindrical electric double-layer capacitor 1 was manufactured in the same manner as in Example 1 except that the mixed carbon was prepared with the same proportions as in Example 7 by using the expandable carbon of this example instead of the expandable carbon of Example 7. The specific surface area of the mixed carbon measured according to the aforementioned method is shown in Table 1. Then, in the same manner as in Example 1, the initial capacitance and the initial actual internal resistance of the cylindrical electric double-layer capacitor 1 were obtained. The results of these are shown in Table 1. In addition, the resistance arithmetic average and the resistance reduction ratio obtained in the same manner as in Example 1 are shown in Table 1.

Example 12

Expandable carbon with an average particle size of 2 micrometers was obtained by grinding the graphitizing alkali activated carbon as expandable carbon used in Example 6 for 30 minutes at 600 rpm by using a planetary ball mill (planetary ball mill P-6 manufactured by Fritsch Japan Co., Ltd.). A cylindrical electric double-layer capacitor 1 was manufactured in the same manner as in Example 1 except that the mixed carbon was prepared with the same proportions as in Example 7 by using the expandable carbon of this example instead of the expandable carbon of Example 7. The specific surface area of the mixed carbon measured according to the aforementioned method is shown in Table 1. Then, in the same manner as in Example 1, the initial capacitance and the initial actual internal resistance of the cylindrical electric double-layer capacitor 1 were obtained. The results of these are shown in Table 1. In addition, the resistance arithmetic average and the resistance reduction ratio obtained in the same manner as in Example 1 are shown in Table 1.

Example 13

Expandable carbon with an average particle size of 2 micrometers was obtained by grinding the graphitizing alkali activated carbon as expandable carbon used in Example 6 for 30 minutes at 600 rpm by using a planetary ball mill (planetary ball mill P-6 manufactured by Fritsch Japan Co., Ltd.). Next, non-expandable carbon with an average particle size of 2 micrometers was obtained by grinding the non-graphitizing steam activated carbon as non-expandable carbon used in Example 6 in the same manner as described above. A cylindrical electric double-layer capacitor 1 was manufactured in the same manner as in Example 1 except that the mixed carbon was prepared with the same proportions of these expandable carbon and non-expandable carbon as in Example 7. The specific surface area of the mixed carbon measured according to the aforementioned method is shown in Table 1. Then, in the same manner as in Example 1, the initial capacitance and the initial actual internal resistance of the cylindrical electric double-layer capacitor 1 were obtained. The results of these are shown in Table 1. In addition, the resistance arithmetic average and the resistance reduction ratio obtained in the same manner as in Example 1 are shown in Table 1.

Example 14

Non-expandable carbon with an average particle size of 2 micrometers was obtained by grinding the non-graphitizing steam activated carbon as non-expandable carbon used in Example 6 for 30 minutes at 600 rpm by using a planetary ball mill (planetary ball mill P-6 manufactured by Fritsch Japan Co., Ltd.). A cylindrical electric double-layer capacitor 1 was manufactured in the same manner as in Example 1 except that the mixed carbon was prepared with the same proportions as in Example 7 by using the expandable carbon of this example instead of the expandable carbon of Example 7. The specific surface area of the mixed carbon measured according to the aforementioned method is shown in Table 1. Then, in the same manner as in Example 1, the initial capacitance and the initial actual internal resistance of the cylindrical electric double-layer capacitor 1 were obtained. The results of these are shown in Table 1. In addition, the resistance arithmetic average and the resistance reduction ratio obtained in the same manner as in Example 1 are shown in Table 1.

Comparative Example 4

A cylindrical electric double-layer capacitor 1 was manufactured in the same manner as in Example 1 except that only the non-graphitizing steam activated carbon as non-expandable carbon used in Example 6 was used. Then, in the same manner as in Example 1, the initial capacitance and the initial actual internal resistance of the cylindrical electric double-layer capacitor 1 were obtained. The results of these are shown in Table 1. In addition, the resistance arithmetic average and the resistance reduction ratio obtained in the same manner as in Example 1 are shown in Table 1.

Comparative Example 5

A cylindrical electric double-layer capacitor 1 was manufactured in the same manner as in Example 1 except that only the graphitizing alkali activated carbon as expandable carbon used in Example 6 was used. Then, in the same manner as in Example 1, the initial capacitance and the initial actual internal resistance of the cylindrical electric double-layer capacitor 1 were obtained. The results of these are shown in Table 1. In addition, the resistance arithmetic average and the resistance reduction ratio obtained in the same manner as in Example 1 are shown in Table 1.

Comparative Example 6

A cylindrical electric double-layer capacitor 1 was manufactured in the same manner as in Example 1 except that only the graphitizing alkali activated carbon as expandable carbon used in Example 11 was used. Then, in the same manner as in Example 1, the initial capacitance and the initial actual internal resistance of the cylindrical electric double-layer capacitor 1 were obtained. The results of these are shown in Table 1. In addition, the resistance arithmetic average and the resistance reduction ratio obtained in the same manner as in Example 1 are shown in Table 1.

Comparative Example 7

A cylindrical electric double-layer capacitor 1 was manufactured in the same manner as in Example 1 except that only the graphitizing alkali activated carbon as expandable carbon used in Example 12 was used. Then, in the same manner as in Example 1, the initial capacitance and the initial actual internal resistance of the cylindrical electric double-layer capacitor 1 were obtained. The results of these are shown in Table 1. In addition, the resistance arithmetic average and the resistance reduction ratio obtained in the same manner as in Example 1 are shown in Table 1.

Comparative Example 8

A cylindrical electric double-layer capacitor 1 was manufactured in the same manner as in Example 1 except that only the non-graphitizing steam activated carbon as non-expandable carbon used in Example 13 was used. Then, in the same manner as in Example 1, the initial capacitance and the initial actual internal resistance of the cylindrical electric double-layer capacitor 1 were obtained. The results of these are shown in Table 1. In addition, the resistance arithmetic average and the resistance reduction ratio obtained in the same manner as in Example 1 are shown in Table 1.

Comparative Example 9

A cylindrical electric double-layer capacitor 1 was manufactured in the same manner as in Example 1 except that only non-graphitizing steam activated carbon (average particle size: 6 micrometers, specific surface area: 2050 $m^2/g$) as non-expandable carbon obtained by steam activating a carbonized coconut shell was used. Then, in the same manner as in Example 1, the initial capacitance and the initial actual internal resistance of the cylindrical electric double-layer capacitor 1 were obtained. The results of these are shown in Table 1. In addition, the resistance arithmetic average and the resistance reduction ratio obtained in the same manner as in Example 1 are shown in Table 1.

Comparative Example 10

A cylindrical electric double-layer capacitor 1 was manufactured in the same manner as in Example 1 except that only graphitizing alkali activated carbon (average particle size: 10 micrometers, specific surface area: 2100 $m^2/g$) as expandable carbon obtained by alkali-activating a graphite carbon material (H/C=0.40) obtained by applying heat treatment to mesophase pitch made of carboniferous heavy oil was used. Then, in the same manner as in Example 1, the initial capacitance and the initial actual internal resistance of the cylindrical electric double-layer capacitor 1 were obtained. The results of these are shown in Table 1. In addition, the resistance arithmetic average and the resistance reduction ratio obtained in the same manner as in Example 1 are shown in Table 1.

Comparative Example 11

A cylindrical electric double-layer capacitor 1 was manufactured in the same manner as in Example 1 except that mixed carbon was prepared with the proportions shown in Table 1 by using the non-graphitizing steam activated carbon as non-expandable carbon used in Comparative Example 9 and the graphitizing alkali activated carbon as expandable carbon used in Comparative Example 10. The specific surface area of the mixed carbon measured according to the aforementioned method is shown in Table 1. Then, in the same manner as in Example 1, the initial capacitance and the initial actual internal resistance of the cylindrical electric double-layer capacitor 1 were obtained. The results of these are shown in Table 1. In addition, the resistance arithmetic average and the resistance reduction ratio obtained in the same manner as in Example 1 are shown in Table 1.

Comparative Example 12

A cylindrical electric double-layer capacitor 1 was manufactured in the same manner as in Example 1 except that only non-graphitizing alkali activated carbon (average particle size: 13 micrometers, specific surface area: 2200 $m^2/g$) as non-expandable carbon obtained by alkali-activating carbonized phenol resin was used. Then, in the same manner as in Example 1, the initial capacitance and the initial actual internal resistance of the cylindrical electric double-layer capacitor 1 were obtained. The results of these are shown in Table 1. In addition, the resistance arithmetic average and the resistance reduction ratio obtained in the same manner as in Example 1 are shown in Table 1.

Example 15

A cylindrical electric double-layer capacitor 1 was manufactured in the same manner as in Example 1 except that mixed carbon was prepared with the proportions shown in Table 1 by using the non-graphitizing alkali activated carbon as non-expandable carbon used in Comparative Example 12 and the graphitizing alkali activated carbon as expandable carbon used in Example 6. The specific surface area of the mixed carbon measured according to the aforementioned method is shown in Table 1. Then, in the same manner as in Example 1, the initial capacitance and the initial actual internal resistance of the cylindrical electric double-layer capacitor 1 were obtained. The results of these are shown in Table 1. In addition, the resistance arithmetic average and the resistance reduction ratio obtained in the same manner as in Example 1 are shown in Table 1.

Comparative Example 13

A cylindrical electric double-layer capacitor 1 was manufactured in the same manner as in Example 1 except that mixed carbon was prepared with the proportions shown in Table 1 by using the non-graphitizing alkali activated carbon as non-expandable carbon used in Comparative Example 12 and the graphitizing alkali activated carbon as expandable carbon used in Comparative Example 10. The specific surface area of the mixed carbon measured according to the aforementioned method is shown in Table 1. Then, in the same manner as in Example 1, the initial capacitance and the initial actual internal resistance of the cylindrical electric double-layer capacitor 1 were obtained. The results of these are shown in Table 1. In addition, the resistance arithmetic average and the resistance reduction ratio obtained in the same manner as in Example 1 are shown in Table 1.

Comparative Example 14

A cylindrical electric double-layer capacitor 1 was manufactured in the same manner as in Example 1 except that only non-graphitizing alkali activated carbon (average particle size: 10 micrometers, specific surface area: 2060 m²/g) as non-expandable carbon obtained by alkali-activating a carbon material obtained by applying heat treatment to isotropic pitch. Then, in the same manner as in Example 1, the initial capacitance and the initial actual internal resistance of the cylindrical electric double-layer capacitor 1 were obtained. The results of these are shown in Table 1. In addition, the resistance arithmetic average and the resistance reduction ratio obtained in the same manner as in Example 1 are shown in Table 1.

Example 16

A cylindrical electric double-layer capacitor 1 was manufactured in the same manner as in Example 1 except that mixed carbon was prepared with the proportions shown in Table 1 by using the non-graphitizing alkali activated carbon as non-expandable carbon used in Comparative Example 14 and the graphitizing alkali activated carbon as expandable carbon used in Example 6. The specific surface area of the mixed carbon measured according to the aforementioned method is shown in Table 1. Then, in the same manner as in Example 1, the initial capacitance and the initial actual internal resistance of the cylindrical electric double-layer capacitor 1 were obtained. The results of these are shown in Table 1. In addition, the resistance arithmetic average and the resistance reduction ratio obtained in the same manner as in Example 1 are shown in Table 1.

Example 17

Expandable carbon with an average particle size of 6 micrometers was obtained by grinding the graphitizing alkali activated carbon as expandable carbon used in Example 6 for 30 minutes at 200 rpm by using a planetary ball mill (planetary ball mill P-6 manufactured by Fritsch Japan Co., Ltd.). A cylindrical electric double-layer capacitor 1 was manufactured in the same manner as in Example 1 except that the mixed carbon was prepared with the proportions shown in Table 1 by using this expandable carbon and the non-graphitizing alkali activated carbon as non-expandable carbon used in Comparative Example 12. The specific surface area of the mixed carbon measured according to the aforementioned method is shown in Table 1. Then, in the same manner as in Example 1, the initial capacitance and the initial actual internal resistance of the cylindrical electric double-layer capacitor 1 were obtained. The results of these are shown in Table 1. In addition, the resistance arithmetic average and the resistance reduction ratio obtained in the same manner as in Example 1 are shown in Table 1.

Example 18

Expandable carbon with an average particle size of 6 micrometers was obtained by grinding the graphitizing alkali activated carbon as expandable carbon used in Example 6 for 30 minutes at 200 rpm by using a planetary ball mill (planetary ball mill P-6 manufactured by Fritsch Japan Co., Ltd.). A cylindrical electric double-layer capacitor 1 was manufactured in the same manner as in Example 1 except that the mixed carbon was prepared with the proportions shown in Table 1 by using this expandable carbon and the non-graphitizing alkali activated carbon as non-expandable carbon used in Comparative Example 14. The specific surface area of the mixed carbon measured according to the aforementioned method is shown in Table 1. Then, in the same manner as in Example 1, the initial capacitance and the initial actual internal resistance of the cylindrical electric double-layer capacitor 1 were obtained. The results of these are shown in Table 1. In addition, the resistance arithmetic average and the resistance reduction ratio obtained in the same manner as in Example 1 are shown in Table 1.

(Evaluation on Initial Performance and Performance after Accelerated Endurance Test of Cylindrical Electric Double-layer Capacitor)

Figure 3:
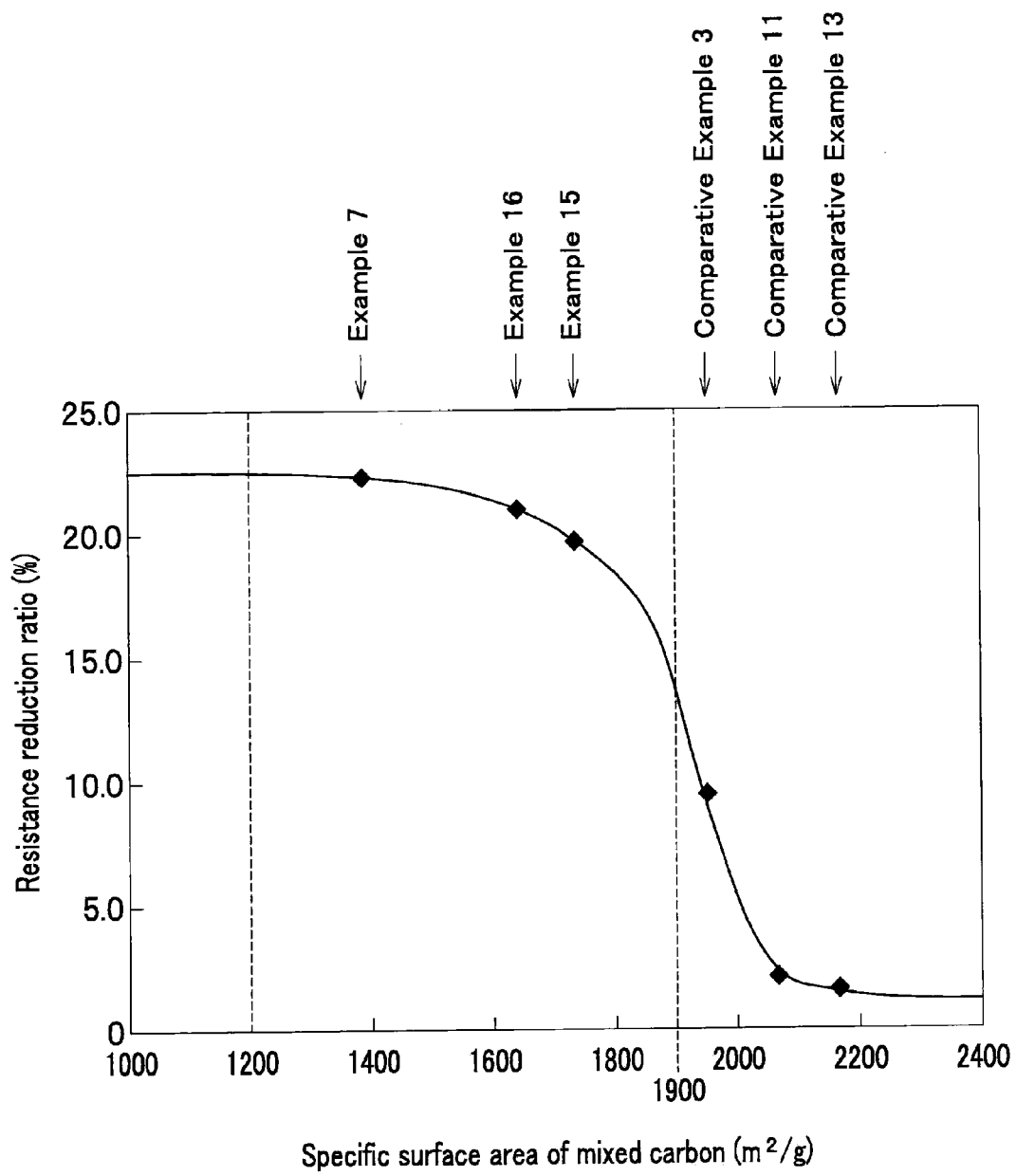
FIG. 3 is a graph showing a relationship between the specific surface area and the resistance reduction ratio of mixed activated carbon used for a polarized electrode, where the horizontal axis indicates the specific surface area ($m^2/g$) of mixed activated carbon and the vertical axis indicates the resistance reduction ratio (%)
Figure 4:
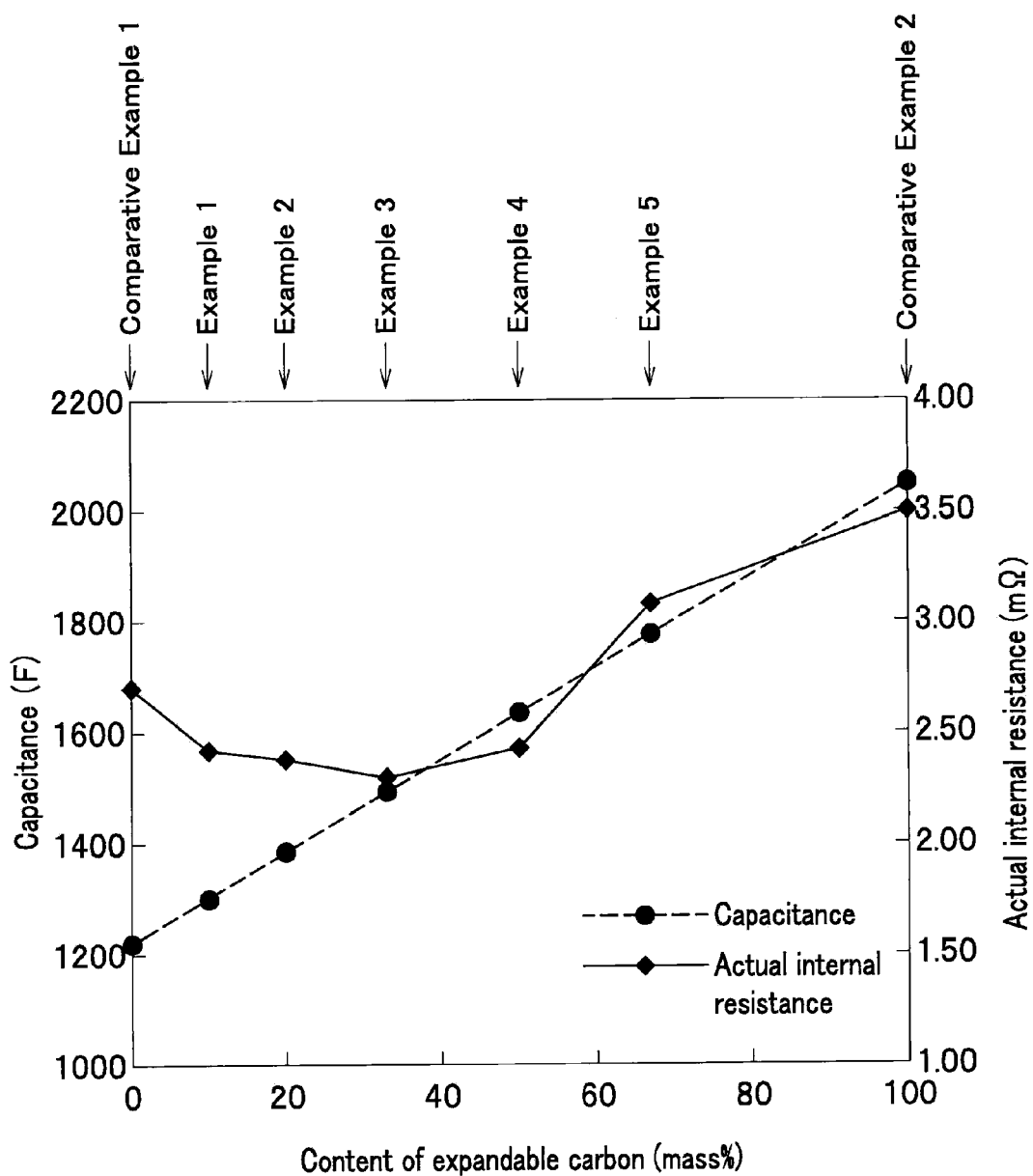
FIG. 4 is a graph showing relationships between the content of expandable carbon in activated carbon (mixed activated carbon) used for the polarized electrode, and the initial capacitance and the initial actual internal resistance, where the horizontal axis indicates the content (mass %) of expandable carbon, the left vertical axis indicates the capacitance (F), and the right vertical axis indicates the actual internal resistance (m$\Omega$)
Figure 5:
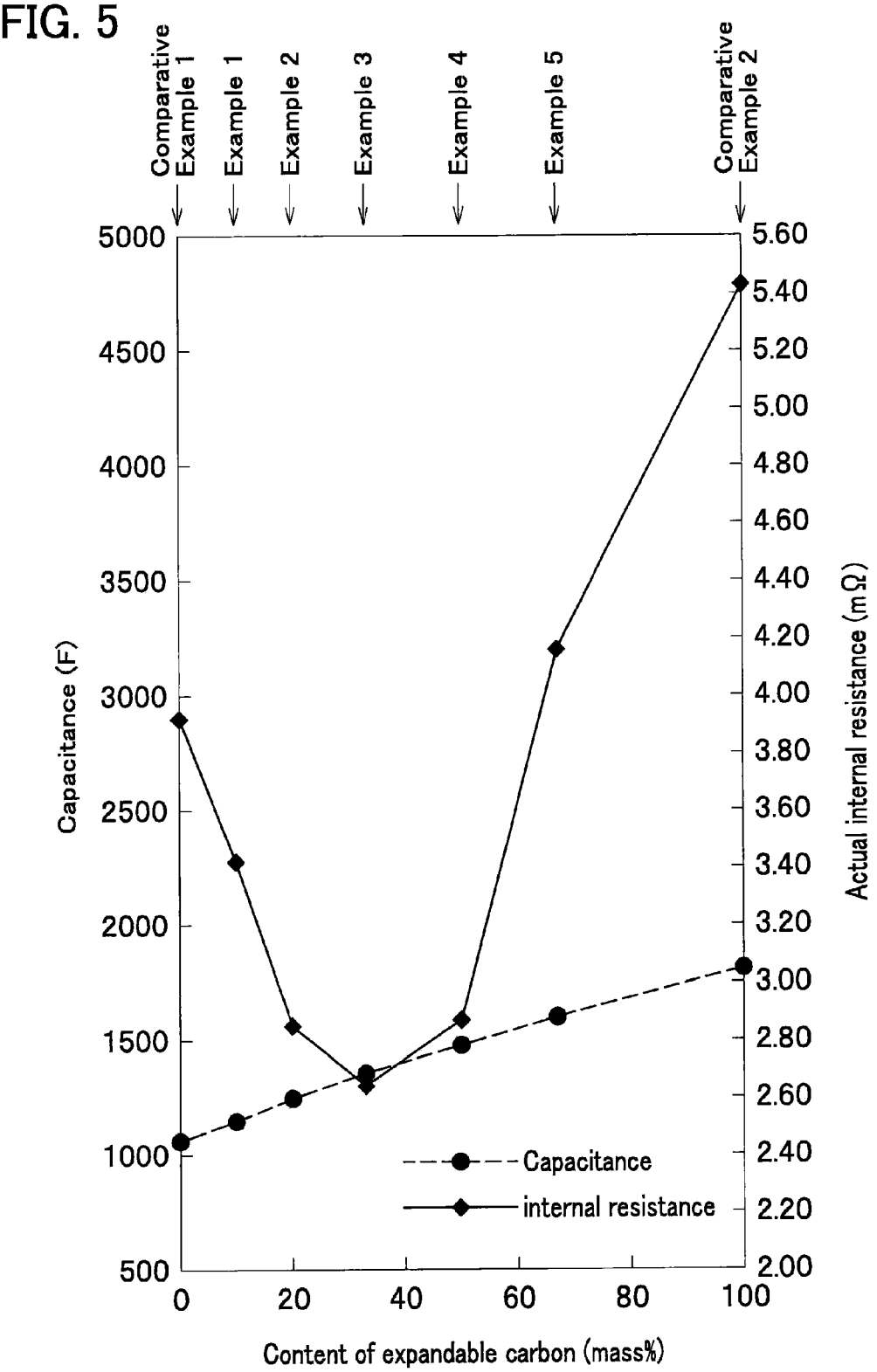
FIG. 5 is a graph showing relationships between the content of expandable carbon in activated carbon (mixed activated carbon) used for the polarized electrode, and the capacitance after an accelerated endurance test and the actual internal resistance after the accelerated endurance test, where the horizontal axis indicates the content (mass %) of expandable carbon, the left vertical axis indicates the capacitance (F), and the right vertical axis indicates the actual internal resistance (m$\Omega$)
Figure 6:
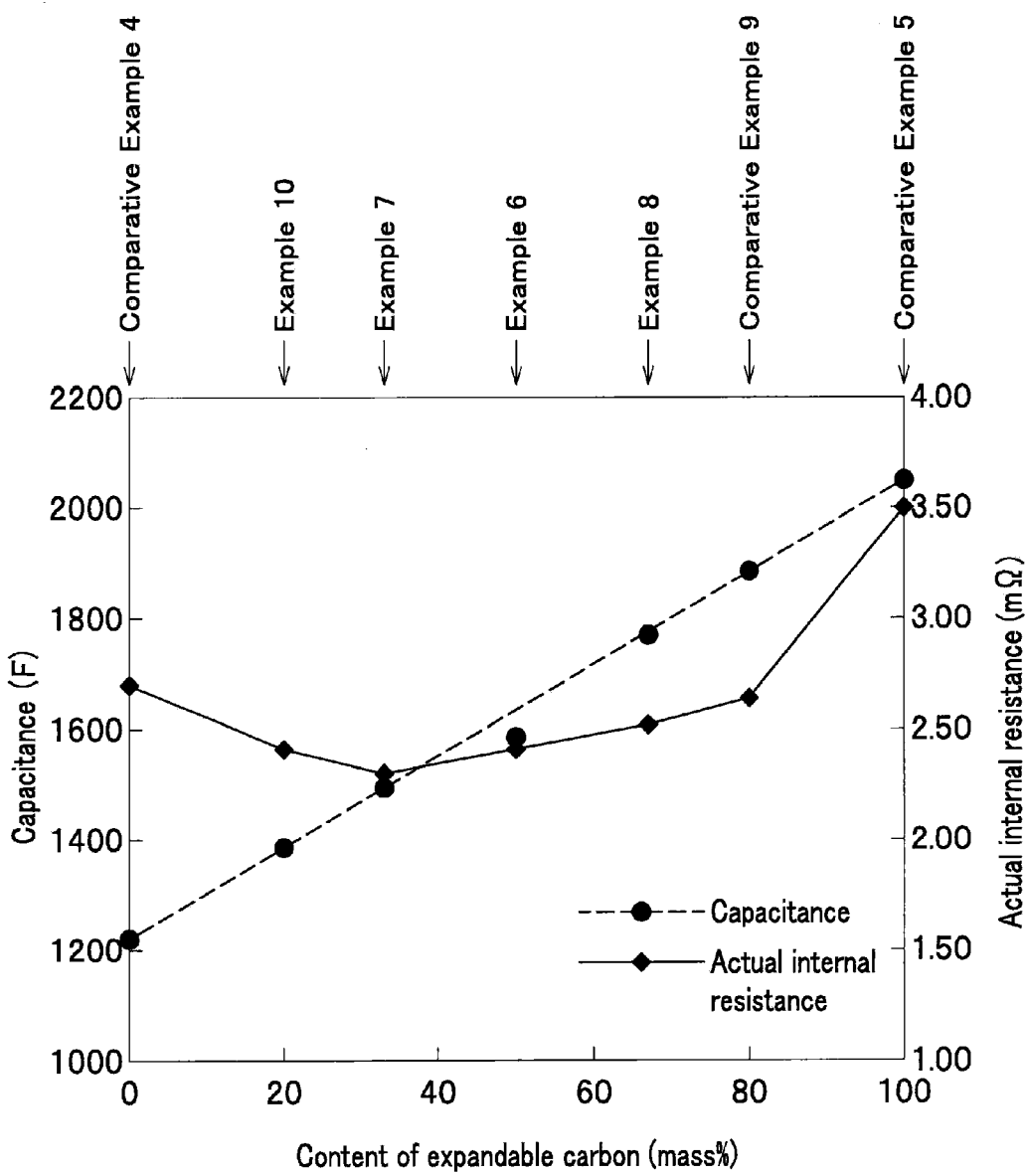
FIG. 6 is a graph showing relationships between the content of expandable carbon in activated carbon (mixed activated carbon) used for the polarized electrode, and the initial capacitance and the initial actual internal resistance, where the horizontal axis indicates the content (mass %) of expandable carbon, the left vertical axis indicates the capacitance (F), and the right vertical axis indicates the actual internal resistance (m$\Omega$)
Figure 7:
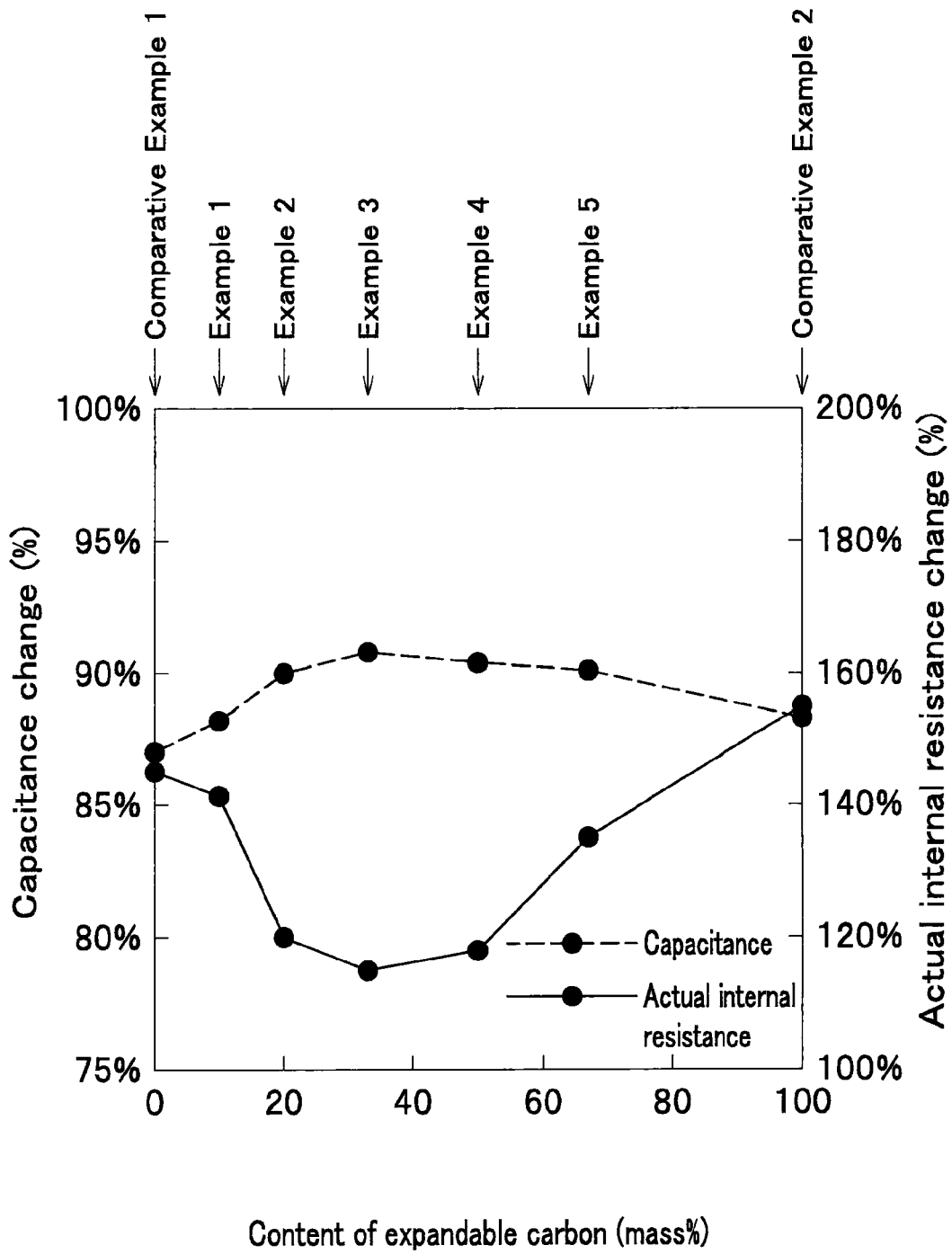
FIG. 7 is a graph showing a relationship between the capacitance change after an accelerated endurance test from the initial capacitance and the actual internal resistance change after the accelerated endurance test from the initial actual internal resistance, where the horizontal axis indicates the content (mass %) of expandable carbon in activated carbon (mixed activated carbon) used for the polarized electrode, the left vertical axis indicates the capacitance change (%), and the right vertical axis indicates the actual internal resistance change (%)

FIG. 3 is a graph showing the relationship between the specific surface area of mixed carbon used for the polarized electrode and the resistance reduction ratio, and the horizontal axis indicates the specific surface area (m²/g) of mixed carbon and the vertical axis indicates the resistance reduction ratio (%). FIG. 4 is a graph showing relationships between the content of expandable carbon in activated carbon (mixed carbon) used for the polarized electrode and the initial capacitance and the initial actual internal resistance, and the horizontal axis indicates the content of expandable carbon (mass %), the left vertical axis indicates the capacitance (F), and the right vertical axis indicates the actual internal resistance (mΩ). FIG. 5 is a graph showing relationships between the content of expandable carbon in activated carbon (mixed carbon) used for the polarized electrode and the capacitance after the accelerated endurance test and the actual internal resistance after the accelerated endurance test, and the horizontal axis indicates the content (mass %) of expandable carbon, the left vertical axis indicates the capacitance (F), and the right vertical axis indicates the actual internal resistance (mΩ). FIG. 6 is a graph showing relationships between the content of expandable carbon in activated carbon (mixed carbon) used for the polarized electrode and the initial capacitance and the initial actual internal resistance, and the horizontal axis indicates the content (mass %) of the expandable carbon, the left vertical axis indicates the capacitance (F), and the right vertical axis indicates the actual internal resistance (mΩ). FIG. 7 is a graph showing a relationship between the capacitance change (%) after the accelerated endurance test from the initial capacitance and the actual internal resistance change after the accelerated endurance test from the initial actual internal resistance, and the horizontal axis indicates the content (mass %) of expandable carbon in activated carbon (mixed carbon) used for the polarized electrode, the left vertical axis indicates the capacitance change (%), and the right vertical axis indicates the actual internal resistance change (%).

As shown in FIG. 3, in the cylindrical electric double-layer capacitors 1 of Example 7, Example 15, Example 16, Comparative Example 3, Comparative Example 11, and Comparative Example 13, the resistance reduction ratio increases as the specific surface area of mixed carbon becomes smaller. This resistance reduction ratio change curves in a reversed S shape, and forms an inflection point at a position at which the specific surface area of mixed carbon is 1900 m²/g. That is, it was found that when the specific surface area of mixed carbon was less than 1900 m²/g, the resistance reduction ratio of the polarized electrode 12 rapidly increased. It was also found that even if the specific surface area of mixed carbon was below 1200 m²/g, a great increase in resistance reduction ratio could not be expected.

From the above-described facts, it was proved that the polarized electrode 12 containing mixed carbon whose specific surface area was less than 1900 m²/g constituted a cylindrical electric double-layer capacitor 1 with an especially low actual internal resistance.

As shown in FIG. 4, FIG. 5, and FIG. 6, in the cylindrical electric double-layer capacitors (see FIG. 4 and FIG. 5) of Examples 1 through 5, Comparative Example 1, and Comparative Example 2, and in the cylindrical electric double-layer capacitors 1 (see FIG. 6) of Examples 6 through 10, Comparative Example 4, and Comparative Example 5, the initial capacitance and the capacitance after the accelerated endurance test increase as the content of expandable carbon increases. The reason for this is considered that the pore distribution in expandable carbon is sharper than that in non-expandable carbon, and the pore volume is small.

The initial actual internal resistance shown in FIG. 4, the actual internal resistance after the accelerated endurance test shown in FIG. 5, and the initial actual internal resistance shown in FIG. 6 lower according to the addition of expandable carbon into non-expandable carbon. Then, reaching a composition with an expandable carbon content of approximately 33 mass % (refer to Example 3), the actual internal resistance increases.

Regarding the actual internal resistance after the accelerated endurance test (see FIG. 5), the actual internal resistance when the content of expandable carbon is 0 mass % (refer to Comparative Example 1) and the actual internal resistance when the content of expandable carbon is approximately 67 mass % (refer to Example 5) are equal to each other.

As shown in FIG. 7, in the cylindrical electric double-layer capacitors 1 of Examples 1 through 5, Comparative Example 1 and Comparative Example 2, regarding the actual internal resistance change after the accelerated endurance test from the initial actual internal resistance, the actual internal resistance change when the content of graphitizing alkali activated carbon is 0 mass % (refer to Comparative Example 1) and the actual internal resistance change when the content of graphitizing alkali activated carbon is approximately 85 mass % are equal to each other.

In other words, the actual internal resistance of the cylindrical electric double-layer capacitor 1 of the embodiment is lower than that in the capacitor using steam activated carbon alone (refer to Comparative Example 1) and the capacitor using alkali activated carbon alone (refer to Comparative Example 2) as shown in FIG. 4 through FIG. 7. In detail, according to the content of graphitizing alkali activated carbon being not more than 85 mass %, the actual internal resistance change is low, and according to the content of the graphitizing alkali activated carbon being not more than 67 mass %, the actual internal resistance after the accelerated endurance test is low.

As described above, the reason for lowering in actual internal resistance of the cylindrical electric double-layer capacitor 1 according to the addition of expandable carbon into non-expandable carbon is considered that the expandable carbon has a graphite structure.

Another reason for lowering in actual internal resistance of the cylindrical electric double-layer capacitor 1 is considered that the expandable carbon expands by absorbing the electrolytic solution, and accordingly, the electrode winding 3 is consolidated, and the contact resistance between the power collecting foil 11 and the polarized electrode 12 lowers.

As still another reason for lowering in actual internal resistance of the cylindrical electric double-layer capacitor 1, it was found that a polarized electrode 12 containing alkali activated carbon, specifically, graphitizing alkali activated carbon as expandable carbon improved extremely low wettability with the electrolytic solution. On the other hand, it was found that the wettability of the polarized electrode made of steam activated carbon with the electrolytic solution was excellent, and the actual internal resistivity difference greatly influenced the wettability of activated carbon with an organic electrolytic solution.

For reference, regarding the measurement results of the contact angle of the electrolytic solution with the electrode surface manufactured according to the same manufacturing method, the contact angle of the polarized electrode 12 of Comparative Example 1 that did not contain expandable carbon (graphitizing alkali activated carbon) was 78 degrees, and the contact angle of the polarized electrode 12 of Comparative Example 2 containing only expandable carbon (graphitizing alkali activated carbon) was 106 degrees.

These contact angles were measured after 10 minutes since droplets of the electrolytic solution used in this example were dropped on the electrode surface in an atmosphere of 25° C., and are averages of three measurements.

As described above, the contact angle of the polarized electrode 12 of Comparative Example 2 is more than 90 degrees, and the contact angle of the polarized electrode 12 of Comparative Example 1 is less than 90 degrees. Specifically, the present invention is realized by synergy in that, by dispersedly blending the steam activated carbon in the electrode body, the ion diffusiveness is improved, and by dispersedly blending expandable carbon (graphitizing alkali activated carbon) composed of high-conductivity particles.

The reason for the highest actual internal resistance in Comparative Example 2 (refer to FIG. 4) with a 100 mass % content of expandable carbon (graphitizing alkali activated carbon) is considered that ion diffusion is hindered by reduction of the gaps between particles in the electrode body according to the expansion of expandable carbon and the small pore volume. Another reason for lowering in actual internal resistance of the cylindrical electric double-layer capacitor 1 is considered that expandable carbon (graphitizing alkali activated carbon) which easily runs short of ions due to its small pore volume was supplied with ions from non-expandable carbon (non-graphitizing steam activated carbon) with a great pore volume.

In addition, a reason for the low actual internal resistance after the accelerated endurance test of the cylindrical electric double-layer capacitor 1 of the present embodiment is considered that the expandable carbon (graphitizing alkali activated carbon) expanded by absorbing the electrolytic solution and pressed the electrode winding 3 inside the airtight container 2, and accordingly, the actual internal resistance increase according to deterioration was suppressed.

(Evaluation on Low-temperature Performance of Cylindrical Electric Double-layer Capacitor)

FIG. 8 is a graph showing relationships between the temperature and the capacitance and the actual internal resistance of the cylindrical electric double-layer capacitor 1, and the horizontal axis indicates the temperature (° C.), the left vertical axis indicates the capacitance (F), and the right vertical axis indicates the actual internal resistance (mΩ).

As shown in FIG. 8, in the cylindrical electric double-layer capacitor 1 of Comparative Example 2, the actual internal resistance greatly increases according to temperature lowering. On the other hand, in the cylindrical electric double-layer capacitor 1 of Example 3, the degree of the actual internal resistance increase is smaller than in Comparative Example 2.

In the cylindrical electric double-layer capacitor 1 of Comparative Example 2, the capacitance greatly lowers according to temperature lowering. On the other hand, in the cylindrical electric double-layer capacitor of Example 3, the capacitance does not greatly change.

In a word, the cylindrical electric double-layer capacitor 1 of the present embodiment is more stable in operation even when it is used in a low-temperature environment. The reason for this is considered that expandable carbon (graphitizing alkali activated carbon) which had a small pore volume and easily runs short of ions in a low-temperature environment was supplied with ions from non-expandable carbon (non-graphitizing steam activated carbon) with a great pore volume.

(Evaluation on Particle Size of Expandable Carbon)

Figure 9:
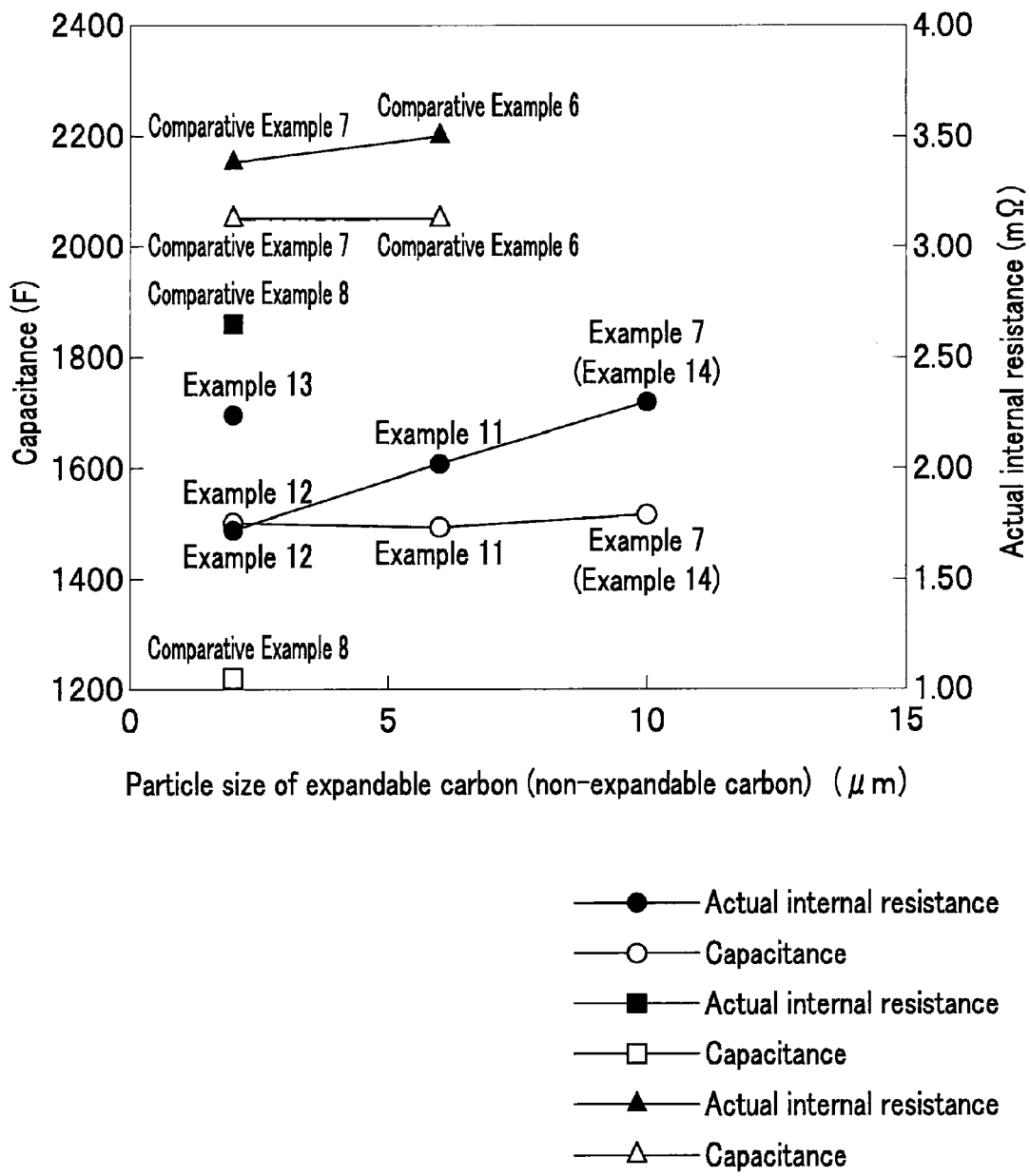
FIG. 9 is a graph showing relationships between the particle size of expandable carbon in activated carbon (mixed activated carbon) used for the polarized electrode and the initial capacitance and the initial actual internal resistance, where the horizontal axis indicates the particle size (micrometer) of expandable carbon, the left vertical axis indicates the capacitance (F), and the right vertical axis indicates the actual internal resistance (m$\Omega$)

FIG. 9 is a graph showing relationships between the particle size of expandable carbon in activated carbon (mixed carbon) used for the polarized electrode and the initial capacitance and the initial actual internal resistance, and the horizontal axis indicates the particle size (micrometers) of expandable carbon, the left vertical axis indicates the capacitance (F), and the right vertical axis indicates the actual internal resistance (mΩ). In FIG. 9, as the particle size of Comparative Example 8, the particle size (micrometers) of non-expandable carbon is shown on the horizontal axis.

As shown in FIG. 9, in the cylindrical electric double-layer capacitors 1 of Example 7, Example 11, and Example 12, as the particle size of expandable carbon (graphitizing alkali activated carbon) becomes smaller, the actual internal resistance lowers. Although the actual internal resistance is lowered, excellent capacitance is maintained. Comparing the cylindrical electric double-layer capacitor 1 of Example 7 and the cylindrical electric double-layer capacitor 1 of Example 14, the particle size of non-expandable carbon (non-graphitizing steam activated carbon) of Example 7 is 6 micrometers, and on the other hand, the particle size of non-expandable carbon (non-graphitizing steam activated carbon) of Example 14 is 2 micrometers (refer to Table 1). As shown in FIG. 9, the actual internal resistance and the capacitance of Example 7 are equal to those of Example 14.

From the above-described facts, it was proved that the actual internal resistance of the cylindrical electric double-layer capacitor 1 could be lowered while excellent capacitance was maintained regardless of the particle size of non-expandable carbon by reducing the particle size of expandable carbon.

On the other hand, in Comparative Example 6 using only the expandable carbon of Example 11 for the polarized electrode 12, the actual internal resistance is much higher than that of Example 11, and in Comparative Example 7 using only the expandable carbon of Example 12 for the polarized electrode 12, the actual internal resistance is much higher than that of Example 12. Comparing the cylindrical electric double-layer capacitor 1 of Comparative Example 6 and the cylindrical electric double-layer capacitor 1 of Comparative Example 7, different from the cylindrical electric double-layer capacitors 1 of Example 7, Example 11, and Example 12, the lowering in actual internal resistance is slight although the particle size of expandable carbon is reduced. The capacitance is also the same. Comparing the cylindrical electric double-layer capacitor 1 of Example 13 and the cylindrical electric double-layer capacitor 1 of Comparative Example 8 using only the non-expandable carbon of Example 13, the cylindrical electric double-layer capacitor 1 of Example 13 is lower in actual internal resistance than in the cylindrical electric double layer capacitor 1 of Comparative Example 8. The capacitance of the cylindrical electric double-layer capacitor 1 of Example 13 is 1494 F that is equal to Example 11 (refer to Table 1), and is greater than the capacitance (1220 F) of the cylindrical electric double-layer capacitor 1 of Comparative Example 8, although this is not shown.

From the above-described facts, it was proved that, by reducing the particle size of expandable carbon and using both expandable carbon and non-expandable carbon, the actual internal resistance of the cylindrical electric double-layer capacitor 1 could be reduced while the excellent capacitance was maintained.

(Evaluation on Specific Surface Area of Expandable Carbon)

As seen in Table 1, the reason for the large initial capacitance and the small initial actual internal resistance of the cylindrical electric double-layer capacitor 1 of Example 3 in comparison with the cylindrical electric double-layer capacitor 1 of Comparative Example 3 is considered that the specific surface area of expandable carbon (graphitizing alkali activated carbon) is small.

What is claimed is:

1. A polarized electrode comprising mixed activated carbon composed of at least two activated carbons with different specific surface areas, wherein the specific surface area of the mixed activated carbon is not less than 900 $m^2/g$ and less than 1900 $m^2/g$.

2. The polarized electrode according to claim 1, wherein the mixed activated carbon contains expandable activated carbon and non-expandable activated carbon.

3. The polarized electrode according to claim 2, wherein in a total amount of the mixed activated carbon, the expandable activated carbon is more than 0 mass % and not more than 85 mass %, and the non-expandable activated carbon is not less than 15 mass % and less than 100 mass %.

4. The polarized electrode according to claim 3, wherein a particle size ratio (D1/D2) of the particle size (D1) of the non-expandable activated carbon to the particle size (D2) of the expandable activated carbon is 0.3 to 1.0.

5. The polarized electrode according to claim 2, wherein a particle size ratio (D1/D2) of the particle size (D1) of the non-expandable activated carbon to the particle size (D2) of the expandable activated carbon is 0.3 to 1.0.

6. The polarized electrode according to claim 2, wherein the expandable activated carbon is graphitizing activated carbon.

7. The polarized electrode according to claim 6, wherein the graphitizing activated carbon is activated carbon obtained by alkali-activating a graphite carbon material obtained by applying heat treatment to mesophase pitch.

8. The polarized electrode according to claim 7, wherein the activated carbon obtained by alkali-activating the graphite carbon material obtained by applying heat treatment to mesophase pitch has a specific surface area not more than 1500 $m^2/g$.

9. The polarized electrode according to claim 2, wherein the non-expandable activated carbon is non-graphitizing activated carbon.

10. The polarized electrode according to claim 9, wherein the non-graphitizing activated carbon is a coconut shell activated carbon.

11. The polarized electrode according to claim 9, wherein the non-graphitizing activated carbon is phenol resin-based activated carbon.

12. The polarized electrode according to claim 9, wherein the non-graphitizing activated carbon is isotropic pitch-based activated carbon.

13. An electric double-layer capacitor comprising the polarized electrode according to any one of claims 1 to 12 or 4.

* * * * *